(12) United States Patent
Tanaka

(10) Patent No.: US 8,381,023 B2
(45) Date of Patent: Feb. 19, 2013

(54) MEMORY SYSTEM AND COMPUTER SYSTEM

(75) Inventor: Shinji Tanaka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 382 days.

(21) Appl. No.: 12/646,349

(22) Filed: Dec. 23, 2009

(65) Prior Publication Data

US 2010/0162040 A1 Jun. 24, 2010

(30) Foreign Application Priority Data

Dec. 24, 2008 (JP) ................................. 2008-327367

(51) Int. Cl.
*G06F 11/00* (2006.01)

(52) U.S. Cl. ........ 714/6.13; 711/203; 711/220; 714/6.1; 714/6.11; 714/6.12; 714/6.32; 714/53

(58) Field of Classification Search .................. 711/203, 711/220; 714/6.1, 6.11, 6.12, 6.13, 6.32, 714/53
See application file for complete search history.

(56) References Cited

U.S. PATENT DOCUMENTS

| | | | | |
|---|---|---|---|---|
| 5,129,088 A * | 7/1992 | Auslander et al. | ................. | 711/1 |
| 5,146,571 A * | 9/1992 | Logan | ......................... | 714/6.13 |
| 5,463,758 A * | 10/1995 | Ottesen | ......................... | 711/114 |
| 5,835,935 A * | 11/1998 | Estakhri et al. | ............... | 711/103 |
| 6,769,081 B1 * | 7/2004 | Parulkar | ......................... | 714/733 |
| 7,062,618 B2 * | 6/2006 | Tsunoda et al. | ............. | 711/154 |
| 7,194,568 B2 * | 3/2007 | Jeter et al. | ........................... | 711/5 |
| 7,664,981 B2 * | 2/2010 | Kim | ............................... | 714/5.1 |
| 7,996,711 B2 * | 8/2011 | Edwards et al. | .............. | 714/6.11 |
| 8,060,688 B2 * | 11/2011 | Mergler et al. | ................ | 711/103 |
| 8,156,277 B2 * | 4/2012 | Kitahara | ......................... | 711/103 |
| 2002/0056054 A1 * | 5/2002 | Yamamoto et al. | .............. | 714/8 |
| 2003/0177334 A1 * | 9/2003 | King et al. | ..................... | 711/209 |
| 2004/0181644 A1 * | 9/2004 | Maor | ............................. | 711/203 |
| 2004/0268179 A1 * | 12/2004 | Stewart | ............................ | 714/8 |
| 2007/0220312 A1 * | 9/2007 | Boyd et al. | ........................ | 714/6 |
| 2007/0300101 A1 * | 12/2007 | Stewart | ............................ | 714/8 |
| 2008/0189588 A1 | 8/2008 | Tanaka et al. | | |
| 2008/0201546 A1 | 8/2008 | Tanaka | | |
| 2009/0138754 A1 * | 5/2009 | Edwards et al. | .................. | 714/6 |
| 2009/0161430 A1 * | 6/2009 | Allen et al. | ............. | 365/185.09 |
| 2009/0172267 A1 * | 7/2009 | Oribe et al. | ..................... | 711/103 |
| 2009/0172466 A1 * | 7/2009 | Royer et al. | ...................... | 714/6 |
| 2009/0172467 A1 * | 7/2009 | Araki | ................................. | 714/6 |
| 2009/0287956 A1 * | 11/2009 | Flynn et al. | ...................... | 714/6 |
| 2010/0042772 A1 * | 2/2010 | Bonella et al. | ................ | 711/103 |
| 2011/0283136 A1 * | 11/2011 | Edwards et al. | ............. | 714/6.11 |

FOREIGN PATENT DOCUMENTS

JP 2008-192267 8/2008

OTHER PUBLICATIONS

U.S. Appl. No. 12/644,616, filed Dec. 22, 2009, Tanaka.

\* cited by examiner

*Primary Examiner* — Joshua P Lottich
(74) *Attorney, Agent, or Firm* — Oblon, Spivak, McClelland, Maier & Neustadt, L.L.P.

(57) ABSTRACT

A memory system according to the present invention includes, in addition to an computing device, a plurality of first blocks that are provided to store information including user information, and first physical addresses not overlapping one another are assigned to, respectively, and a plurality of second blocks that are provided to store first physical addresses of initial defect blocks out of the plurality of first blocks, respectively, wherein the computing device finds the first physical address corresponding a inputted given logical address, based on a given mirror logical address corresponding to the given logical address, and information stored in the second blocks.

7 Claims, 19 Drawing Sheets

F I G . 1
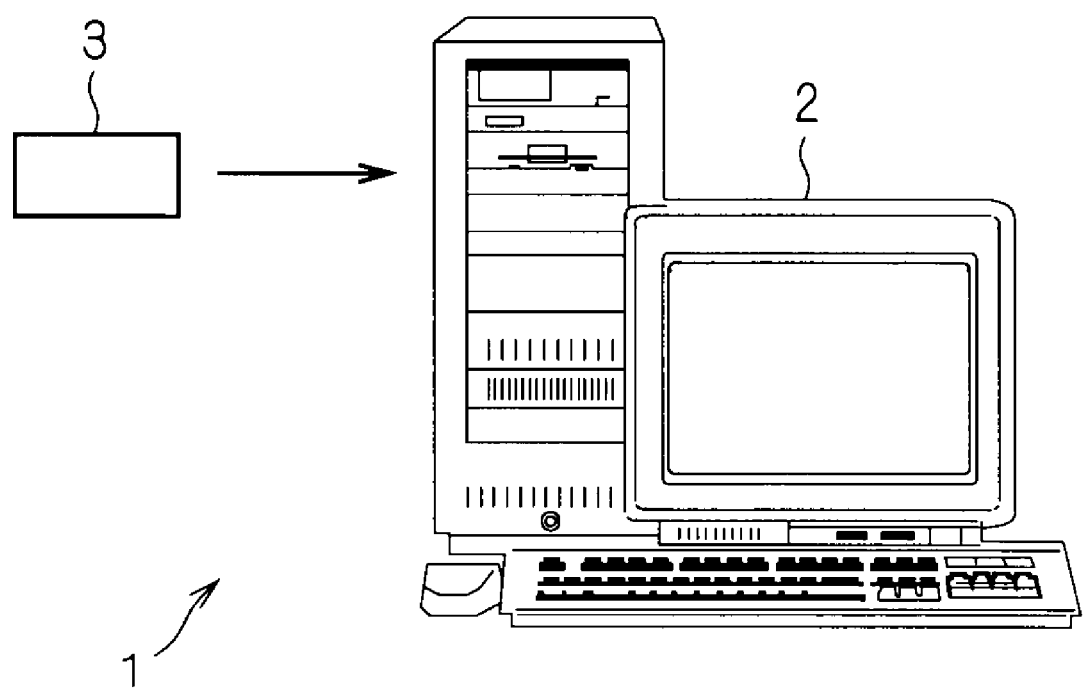

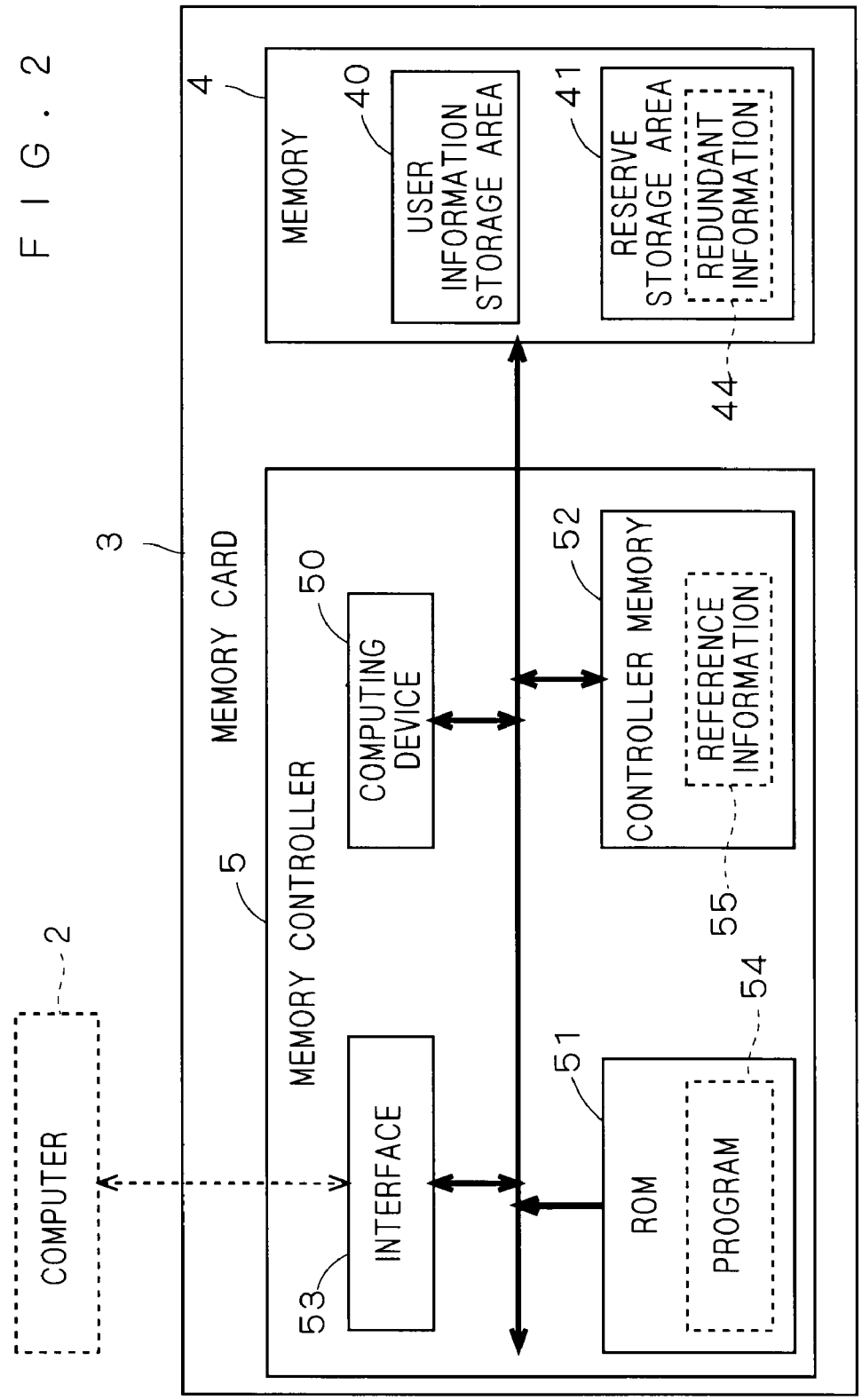

F I G . 1 0
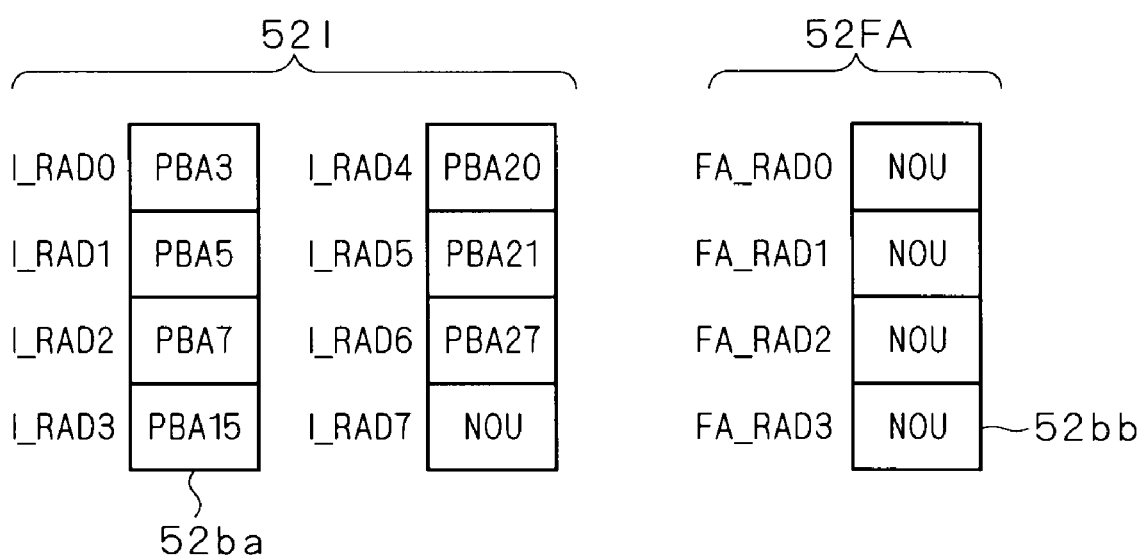

F I G. 1 1 A
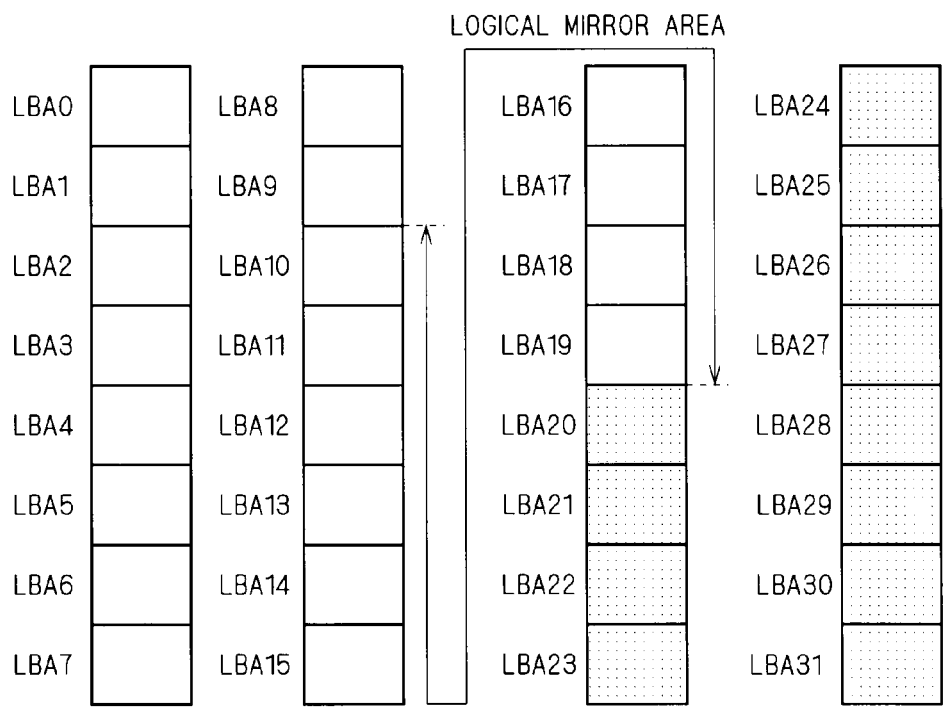
F I G. 1 1 B
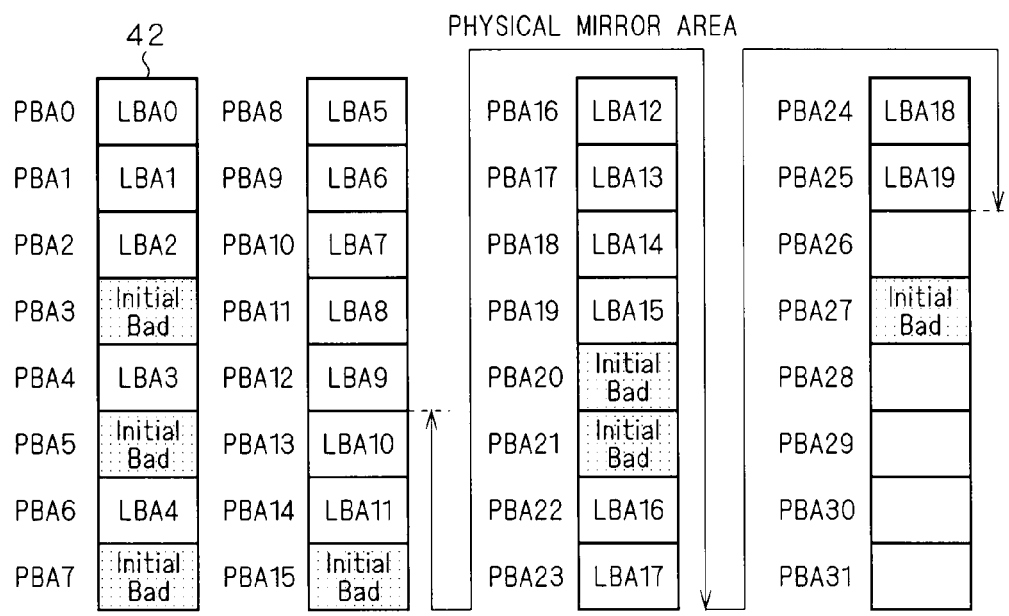

FIG. 12

| LOGICAL ADDRESS | MIRROR LOGICAL AREA |
|---|---|
| LBA0 | LBA10 |
| LBA1 | LBA11 |
| LBA2 | LBA12 |
| LBA3 | LBA13 |
| LBA4 | LBA14 |
| LBA5 | LBA15 |
| LBA6 | LBA16 |
| LBA7 | LBA17 |
| LBA8 | LBA18 |
| LBA9 | LBA19 |

FIG. 13

| PHYSICAL ADDRESS OF USER INFORMATION BLOCK | PHYSICAL ADDRESS OF DUPLICATED USER INFORMATION BLOCK |
|---|---|
| PBA0 | PBA13 |
| PBA1 | PBA14 |
| PBA2 | PBA16 |
| PBA4 | PBA17 |
| PBA6 | PBA18 |
| PBA8 | PBA19 |
| PBA9 | PBA22 |
| PBA10 | PBA23 |
| PBA11 | PBA24 |
| PBA12 | PBA25 |

F I G . 1 8 A
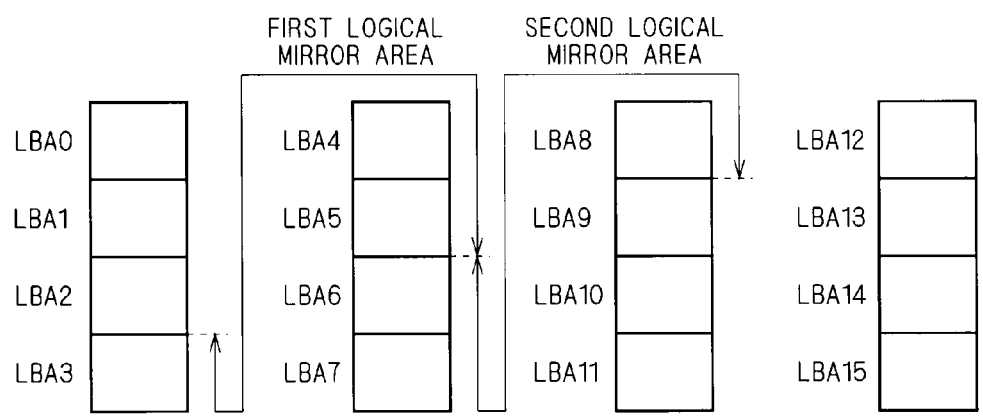
F I G . 1 8 B
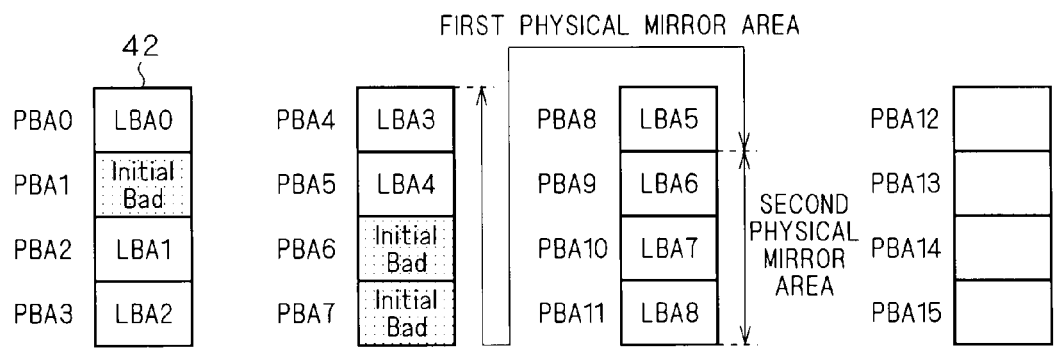

FIG. 19

| LOGICAL ADDRESS | FIRST MIRROR LOGICAL ADDRESS | SECOND MIRROR LOGICAL ADDRESS |
|---|---|---|
| LBA0 | LBA3 | LBA6 |
| LBA1 | LBA4 | LBA7 |
| LBA2 | LBA5 | LBA8 |

FIG. 20

| PHYSICAL ADDRESS OF USER INFORMATION BLOCK | PHYSICAL ADDRESS OF FIRST DUPLICATED USER INFORMATION BLOCK | PHYSICAL ADDRESS OF SECOND DUPLICATED USER INFORMATION BLOCK |
|---|---|---|
| PBA0 | PBA4 | PBA9 |
| PBA2 | PBA5 | PBA10 |
| PBA3 | PBA8 | PBA11 |

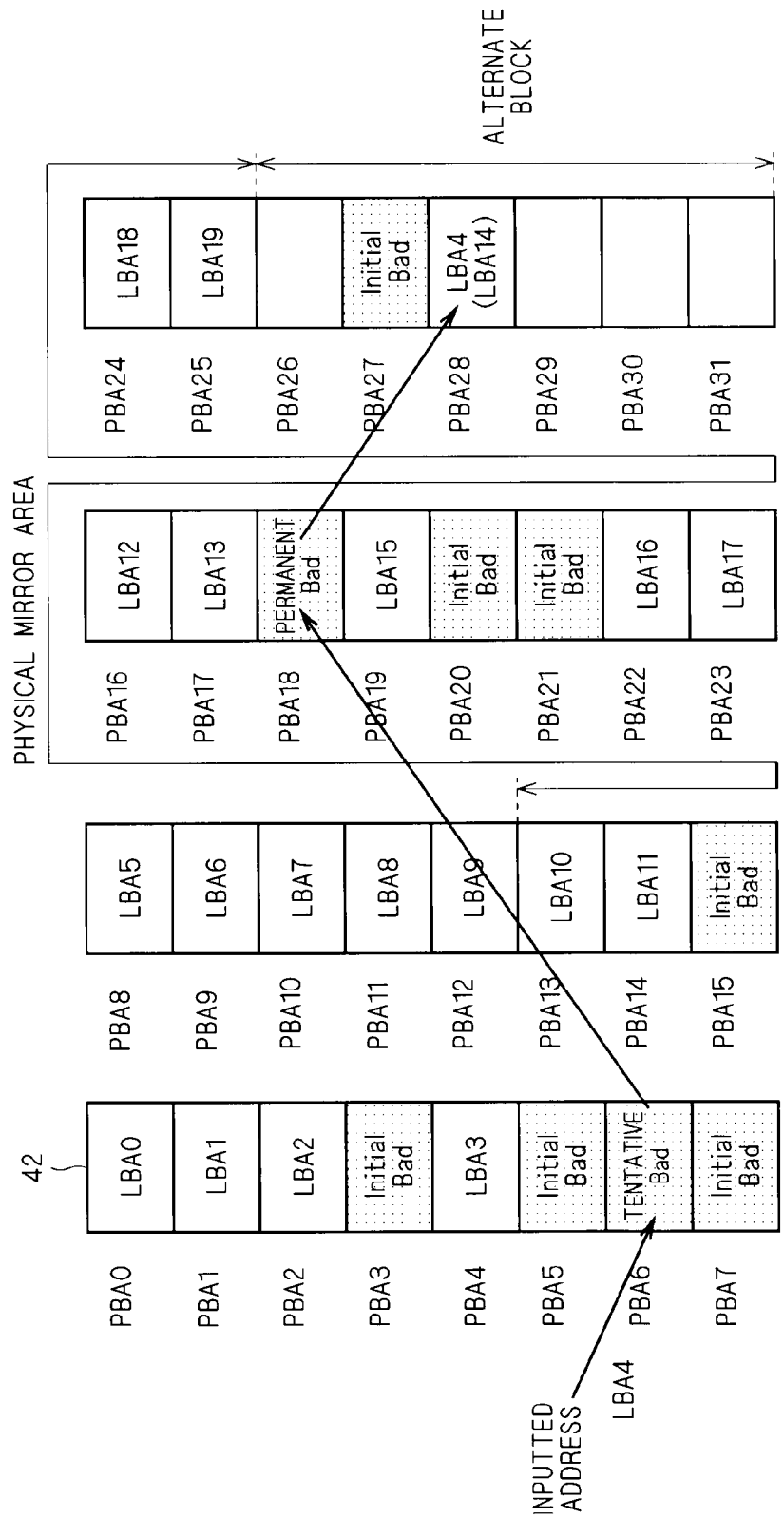

F I G. 2 3
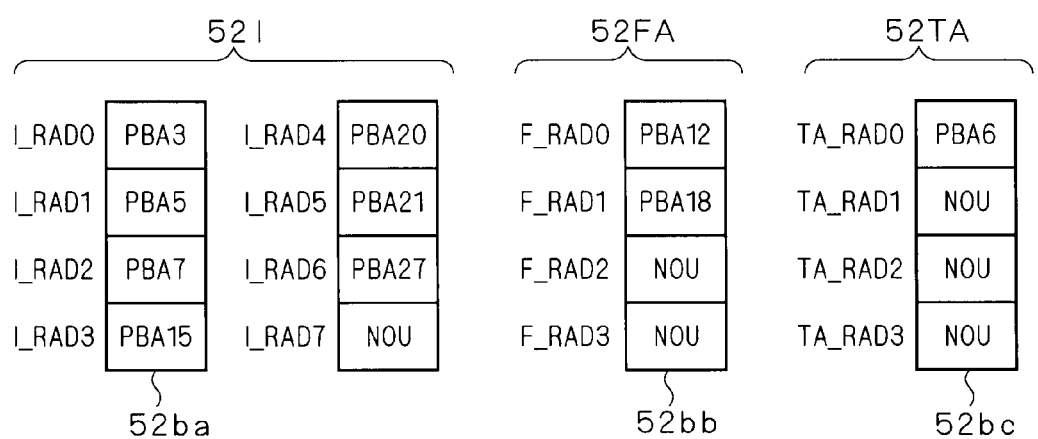

MEMORY SYSTEM AND COMPUTER SYSTEM

BACKGROUND OF THE INVENTION

1. Field of the Invention

The present invention relates to logical-physical conversion processing when a bit error occurs in a nonvolatile semiconductor memory due to read disturb and the like.

2. Description of the Background Art

Among nonvolatile memories, a NAND flash memory can bring about high integration and reduction in manufacturing cost by a simple circuit configuration, and make writing by a user easier, thereby being employed in an SD memory card and the like in abundance.

Recently, the NAND flash memory has also been employed in a game machine and the like. When the NAND flash memory is used in the game machine and the like, writing does not occur, but continuous reading occurs. That is, the NAND flash memory is increasingly employed as a ROM.

However, since in the game machine and the like, a specific program is often read repeatedly, a possibility that the program is unintentionally rewritten is beginning to be pointed out. This phenomenon is called a "read disturb" phenomenon (e.g., refer to Japanese Patent Application Laid-Open No. 2008-192267).

As described in Japanese Patent Application Laid-Open No. 2008-192267, when binary data stored in a selected cell is repeatedly read, there is a possibility that a threshold voltage of an unselected cell shifts, and that binary data that the unselected cell stores is unintentionally rewritten from 1 to 0 (this is called a "read disturb" phenomenon).

A bit error herein is not an irreversible error due to physical damage (in this specification, referred to as a permanent late defect) but a reversible error caused by the stored binary data changing with time (in this specification, referred to as a tentative late defect). Particularly, a bit error due to read disturb (read disturb error) is caused by repeatedly executing reading processing in a specific storage area of the flash memory without performing writing and erasing.

As a technique for preventing the "read disturb" phenomenon is cited the foregoing Japanese Patent Application Laid-Open No. 2008-192267.

However, processing for repairing the above-described bit error is highly loaded processing involving reading of the data, error correction, erasing/writing of the data after the correction and the like. Accordingly, if the repair processing is frequently performed, data reading processing from the NAND flash memory may be affected, so that an ongoing game may not normally behave.

Moreover, it is considered that the erasing/writing or the like causes the foregoing uncorrectable late defect (permanent late defect) in a block making up the NAND flash memory.

SUMMARY OF THE INVENTION

One object of the present invention is to provide a technique that does not allow data reading processing to be affected even if a "read disturb" phenomenon has occurred.

In order to achieve the above-described object, a first aspect of a memory system according to the present invention includes a plurality of first blocks that are provided to store information including user information and first physical addresses not overlapping one another are respectively assigned to, a plurality of second blocks that are provided to respectively store the first physical addresses of initial defect blocks out of the plurality of first blocks, a plurality of user information blocks, out of the plurality of first blocks, that store the user information, a plurality of duplicated user information blocks, out of the plurality of first blocks, that each store a duplicate of the user information, and a computing device that finds the first physical address corresponding to a given logical address, wherein the computing device has, as information, mirror logical addresses for accessing the duplicated user information blocks, any one of the mirror logical addresses having a one-on-one correspondence relationship with the logical address inputted to access the user information block, and the computing device finds the first physical address corresponding to the given logical address, based on the given mirror logical address corresponding to the inputted given logical address and information stored in the second blocks.

In this manner, in the memory system according to the present invention, the mirror area is provided, and if a tentative late defective block has occurred due to a "read disturb" phenomenon, logical-physical conversion processing is carried out to enable access to the mirror area. Accordingly, the memory system and a computer system in which data reading processing is not affected even if the tentative late defective block has occurred due to the "read disturb" phenomenon can be provided. In other words, "read disturb" resistance can be doubled.

Moreover, even if a late defect has occurred in a memory, the memory system and the computer system that need not change correspondence relationships in the logical-physical conversion across many blocks can be provided.

Moreover, a second aspect of the memory system according to the present invention is directed to the above-described first aspect, wherein second physical addresses not overlapping one another are respectively assigned to the second blocks, and the first physical addresses of the initial defect blocks stored in the second blocks are stored in the second blocks in the order of the second physical addresses in accordance with the order of the first physical addresses.

This can reduce the number of the second blocks necessary for finding the first physical address.

Moreover, a third aspect of the memory system according to the present invention is directed to the above-described second aspect, wherein the computing device performs the steps of (A) searching a target block from the second blocks using the given mirror logical address, (B) finding the number of the first blocks, existing before the first physical address of the initial defect block read from the target block, other than the initial defect blocks, based on the first physical address of the initial defect block read from the target block, and the second physical address of the target block, and (C) finding the first physical address corresponding to the given logical address, based on the given mirror logical address and the number.

According to this, the physical addresses of the first blocks other than the initial defect blocks need not be stored. Alternatively, properties (presence and absence of the defect) and the physical addresses of transfer destinations need not be stored for all the blocks. Accordingly, the number of the second blocks can be reduced.

Moreover, a fourth aspect of the memory system according to the present invention is directed to the above-described third aspect, wherein the computing device performs the steps of (D) finding the first physical address corresponding to the given logical address, based on the given logical address and the information stored in the second blocks, (E) determining whether or not the first block specified by the first physical address found in the step (D) is a tentative late defective block, and (F) performing the processing of the steps (A) to (C) when the first block is determined to be the tentative late defective block in the step (E).

This can prevent access to the first physical address found in the step (D), and whether or not to perform further logical-physical conversion processing can be determined. Also, the invention according to the above-described first aspect can be realized in the easy method.

Moreover, a fifth aspect of the memory system according to the present invention is directed to the above-described fourth aspect, wherein the computing device, in the step (F), determines that the first block is the tentative late defective block when the number of bit errors of the first block specified by the first physical address found in the step (D) exceeds a threshold value set in advance.

This can prevent access to the first physical address found in the step (D), and whether or not to perform further logical-physical conversion processing can be determined. Also, the invention according to the above-described first aspect can be realized in the easy method.

Moreover, a sixth aspect of the memory system according to the present invention is directed to the above-described fourth aspect, wherein the memory system further includes a plurality of third blocks provided to respectively store the first physical addresses of the tentative late defective blocks out of the plurality of first blocks, and the computing device performs the step of (G) recording the first physical address found in the step (D) in the third block, when the first block is determined to be the tentative late defective block in the step (E).

According to this, the subsequent logical-physical conversion processing can be performed dynamically based on the updated information of the third blocks.

Moreover, a seventh aspect of the memory system according to the present invention is directed to the above-described fourth aspect, wherein the computing device performs the step of (H) repairing the first block determined to be the tentative late defective block in the step (E), using the information in the duplicated user information block corresponding to the first block.

According to this, data repair of the tentative late defective block is enabled, and access to the first block after repair can be restarted.

Moreover, an eighth aspect of the memory system according to the present invention is directed to the above-described seventh aspect, wherein when the first block is determined to be beyond repair as a result of the repair in the step (H), the computing device performs the step of (I) transferring the first physical address information of the first block determined to be beyond repair from the third block to a management area made up of a part of the first blocks as information relating to a permanent late defective block.

According to this, the address information of the first block determined to be beyond repair can be saved in the management area as backup or information indicating that it is the permanent late defective block.

Moreover, a ninth aspect of the memory system according to the present invention is directed to the above-described fourth aspect, wherein the memory system further includes a plurality of other duplicated user information blocks, out of the plurality of first blocks, that each store another duplicate of the user information, and the computing device has, as information, other mirror logical addresses for accessing the other duplicated user information blocks, any one of the other mirror logical addresses having a one-on-one correspondence relationship with the logical address inputted to access the user information block, and the computing device finds the first physical address corresponding to the given logical address, based on the given other mirror logical address corresponding to the inputted given logical address and the information stored in the second blocks.

This can further increase reliability of the memory system.

Moreover, a tenth aspect of the memory system according to the present invention is directed to the above-described ninth aspect, wherein the computing device performs the steps of (J) determining whether or not the first block specified by the first physical address found in the step (C) is a tentative late defective block, and (K) finding the first physical address corresponding to the given logical address, based on the given other mirror logical address corresponding to the inputted given logical address and the information stored in the second blocks, when the first block is determined to be the tentative late defective block in the step (J).

This can further increase reliability of the memory system.

Moreover, an eleventh aspect of the memory system according to the present invention is directed to the above-described fourth aspect, wherein the memory system further includes a plurality of fourth blocks provided to respectively store the first physical addresses of permanent late defective blocks out of the plurality of first blocks, and the computing device performs the step of (L) determining whether or not the first physical address found in the step (C) matches information stored in the fourth blocks.

According to this, when an access is made to the found first physical address, whether or not a permanent late defect has occurred in the relevant accessed first block can be determined, and whether or not to perform further logical-physical conversion processing can be determined.

Moreover, a twelfth aspect of the memory system according to the present invention is directed to the above-described eleventh aspect, wherein fourth physical addresses not overlapping one another are respectively assigned to the fourth blocks, and when the computing device determines the matching in the step (L), the computing device performs the steps of (M) finding a alternate logical address, based on the fourth physical address of the fourth block storing the first physical address found in the step (C) and a leading alternate logical address prepared in advance, and (N) finding the first physical address corresponding to the given logical address, based on the alternate logical address and the information stored in the second blocks.

According to this, even if the duplicated user information block has become a permanent late defective block, the physical address of an alternate destination for the inputted given logical address can be decided in the easy method.

Moreover, a thirteenth aspect of the memory system according to the present invention is directed to the above-described twelfth aspect, wherein the first physical addresses of the permanent late defective blocks stored in the fourth blocks are stored in the fourth blocks in the order of the fourth physical addresses in accordance with the order of occurrence of permanent late defects.

This can reduce the number of the fourth blocks necessary for finding the first physical address.

Moreover, a fourteenth aspect of the memory system according to the present invention is the above-described sixth aspect, wherein the second blocks and the third blocks are held in a volatile memory.

This enables the computing device to access the second blocks, and the third blocks at a high speed. Thus, increase in speed of the logical-physical conversion processing is enabled.

Moreover, a fifteenth aspect of the memory system according to the present invention is directed to the above-described eleventh aspect, wherein the second blocks, the third blocks and the fourth blocks are held in a volatile memory.

This enables the computing device to access the second blocks, the third blocks and the fourth blocks at a high speed. Thus, increase in speed of the logical-physical conversion processing is enabled.

Moreover, a computer system according to the present invention includes a computer that generates a logical address, a memory having a plurality of first blocks that are provided to store information including user information and first physical addresses not overlapping one another are respectively assigned to, a plurality of user information blocks, out of the plurality of first blocks, that store the user information, and a plurality of duplicated user information blocks, out of the plurality of first blocks, that each store a duplicate of the user information, a controller memory having a plurality of second blocks that are provided to respectively store the first physical addresses of initial defect blocks out of the plurality of first blocks, and second physical addresses not overlapping one another are respectively assigned to, and a computing device that finds the first physical address corresponding to the logical address, and the computing device has, as information, mirror logical addresses for accessing the duplicated user information blocks, any one of the mirror logical addresses having a one-on-one correspondence relationship with the logical address inputted to access the user information block, and the computing device finds the first physical address corresponding to the logical address, based on the given mirror logical address corresponding to the inputted given logical address and information stored in the second blocks.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a computer system according to the present invention;

FIG. 2 is a block diagram showing a configuration of a memory card;

FIG. 10 is a diagram illustrating a structure of information stored in a first management area and a second management area as reference information;

FIGS. 11A and 11B are diagrams for explaining logical-physical conversion processing operation according to a first embodiment;

FIG. 12 is a diagram showing one-on-one relationships between the logical addresses and the mirror logical addresses;

FIG. 13 is a diagram showing relationships between first physical addresses of first blocks in which original data is stored, and first physical addresses of first blocks in which duplicated data of the original data is stored;

FIGS. 18A and 18B are diagrams for explaining logical-physical conversion processing operation according to a third embodiment;

FIG. 19 is a diagram showing one-on-one relationships between the logical addresses and the respective mirror logical addresses;

FIG. 20 is a diagram showing relationships between the first physical addresses of the first blocks in which original data is stored, and the first physical addresses of the first blocks in which duplicated data of the original data is stored;

FIG. 22 is a diagram for explaining logical-physical conversion processing operation according to a fourth embodiment;

FIG. 23 is a diagram illustrating a structure of information stored in first, second and third management areas as reference information.

DESCRIPTION OF THE PREFERRED EMBODIMENTS

Figure 3:
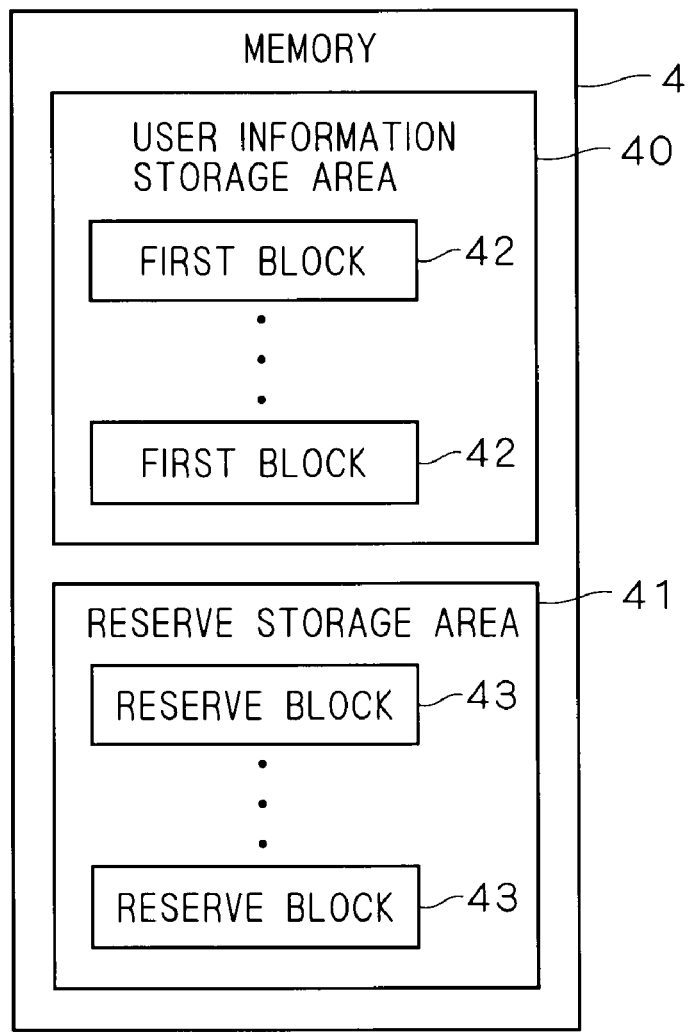
FIG. 3 is a schematic diagram showing an internal structure of a memory.

First, a configuration and operation as premises of the present invention are described (these can be understood as a configuration and operation disclosed in Japanese Patent Application Laid-Open No. 2008-192267).

FIG. 1 is a diagram showing a computer system 1. The computer system 1 includes a computer 2 having a function as a general personal computer, and a memory card 3 that is inserted into a card slot of the computer 2. A logical address is sent and received between the computer 2 and a computing device 50, and a physical address is sent and received between the computing device 50 and a memory 4.

The computer 2, for example, operates in accordance with a program such as application software stored in a storage device, and sends an access request to the memory card 3 as needed.

The access request hereinafter is a writing request of user data, a reading request of user data stored in the memory card 3 (the memory 4 shown in FIG. 2), or the like. Accordingly, in the case of the writing request, the computer 2 generates a logical address indicating a writing position of the user data to be written. Moreover, in the case of the reading request, the computer 2 generates a logical address indicating a position where the user data to be read is stored. The access request generated in the computer 2 includes the logical address, and is sent to the memory card 3 through an interface.

FIG. 2 is a block diagram showing a configuration of the memory card 3. The memory card 3 includes the memory 4 and a memory controller 5 that controls the memory 4, and has a detachable structure from the computer 2.

FIG. 3 is a schematic diagram showing an internal structure of the memory 4. As shown in FIG. 3, the memory 4 includes a user information storage area 40 made up of a plurality of first blocks 42, and a reserve storage area 41 made up of a plurality of reserve blocks 43.

Figure 4:
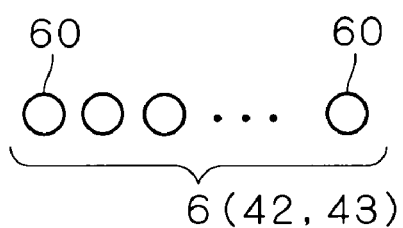
FIG. 4 is a diagram showing a structure of a block in the memory.

FIG. 4 is a diagram showing a structure of a block 6 in the memory 4 (the first block 42 and the reserve block 43). The plurality of blocks 6 that the memory 4 has are each made up of a plurality of storage elements 60 (storage element group) as shown in FIG. 4, and are each a congregation of the storage elements, each of which is accessed by a unique physical address (first physical address) that does not overlap one another.

Here, the number of the storage elements 60 included in the first block 42 only needs to be at least the number of the storage elements 60 necessary for storing user data specified by the unique physical address. In other words, it is decided by a capacity of the user data read (or written) at one access.

Moreover, the number of the storage elements 60 included in the reserve block 43 only needs to be at least the number of storage elements 60 necessary for storing a physical address that individually specifies the first block 42. In other words, a length (capacity) of the physical address is decided by the number of the first blocks 42 that the memory 4 includes.

Figure 5:
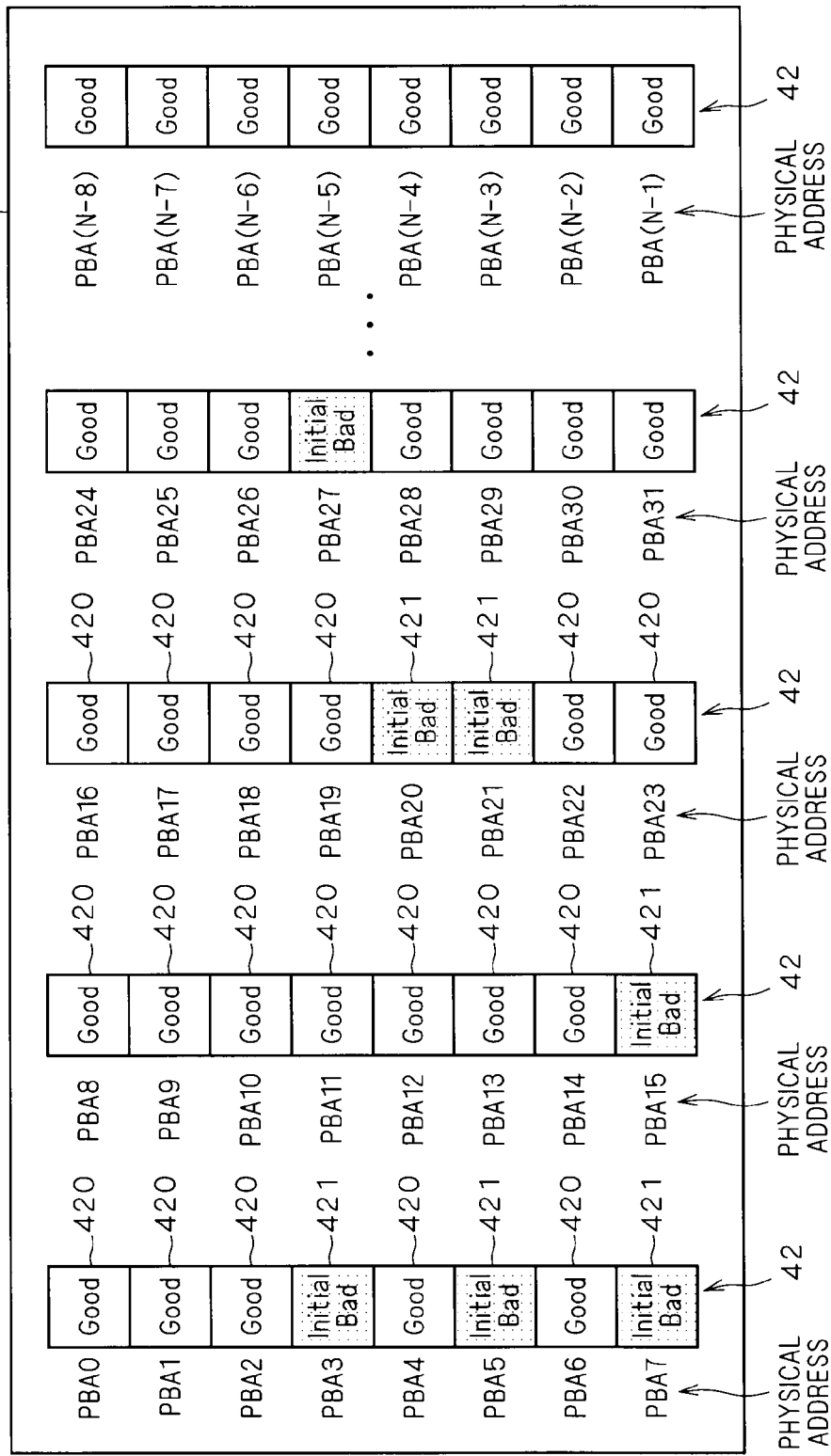
FIG. 5 is a diagram illustrating a user information storage area.

FIG. 5 is a diagram illustrating the user information storage area 40. In the present specification, for example, physical addresses in a specific (A) physical address space are collectively referred to as "physical addresses A", and a k-th physical address A of them is referred to as a "physical address Ak" (where k is an integer of 0 or more).

As described before, the user information storage area 40 is a storage area made up of the plurality of (N) first blocks 42, and stores user data (N is a natural number). To the respective first blocks 42 are assigned physical addresses PBA (physical addresses PBA0 to PBA(N−1)) that do not overlap one another. The physical address PBA on the memory 4 corresponds to a first physical address in the present invention.

Generally, among the first blocks 42 formed in the memory 4 as a product, there are blocks that can be accessed normally (normal blocks) and blocks that cannot be accessed (defect blocks). Since the defect blocks cannot be accessed (utilized), no user data is stored in the defect blocks, and no logical addresses are assigned. Moreover, as types of the defect, there are an initial defect that occurred before the use of the memory 4, such as at factory, and a late defect that occurs in the use of the memory 4.

Furthermore, in the invention of the application, as the late defect which occurs late, there are a tentative late defect and a permanent late defect. The tentative late defect is a late defect when the block can be returned to a normal block by repair processing (refresh) to the relevant block in the memory 4. In contrast, the permanent late defect is a late defect when the block cannot be returned to a normal block even by the repair processing (refresh) to the relevant block in the memory 4.

For convenience in illustration, in FIG. 5, it seems as if "Good" is stored in normal blocks 420, and "Initial Bad" is stored in initial defect blocks 421 as information, respectively. However, in fact, one unit in which the user data is stored is defined as the first block 42, and in the first block 42, no information indicating a status of the block is stored. In description here before subsequent description of a first embodiment or later, a discussion is carried forward on the premise that the defect block is only the initial defect block (in the description of the first embodiment or later, the late defective block will be explained as the defect block, in addition to the initial defect block).

Figure 6:
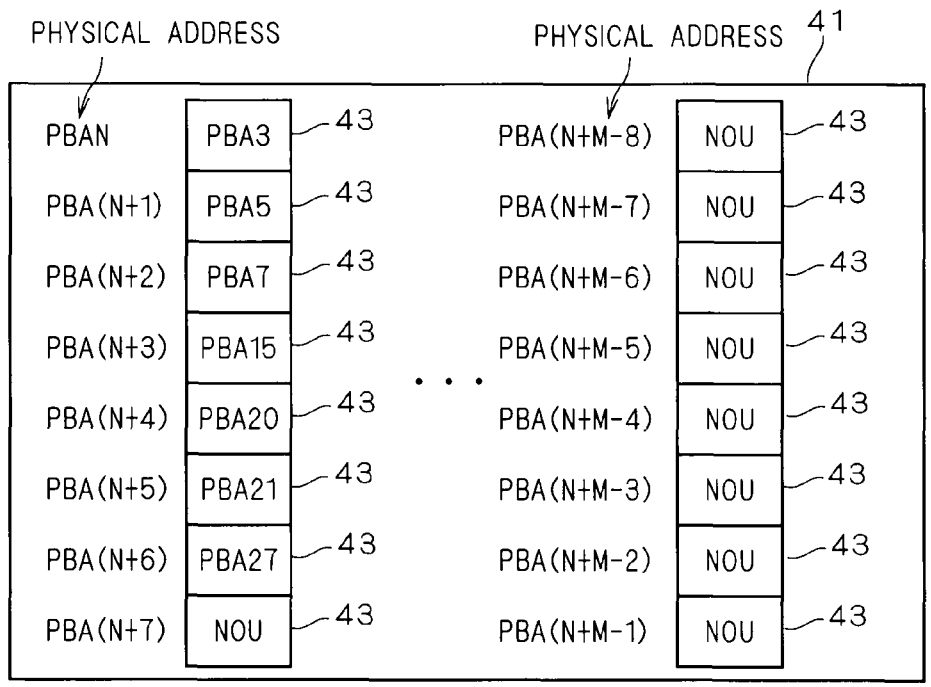
FIG. 6 is a diagram illustrating a reserve storage area.

FIG. 6 is a diagram illustrating the reserve storage area 41 for the user information storage area 40 shown in FIG. 5. As described before, the reserve storage area 41 is a storage area made up of the plurality of (M) reserve blocks 43, and stores redundant information 44 (FIG. 2). The redundant information 44 is information necessary when the remote controller 5 described later converts a logical address to a physical address.

To the respective reserve blocks 43 are assigned physical addresses (physical addresses PBAN to PBA(N+M−1) on the memory 4. The physical address of the aftermost first block 42 in the user information storage area 40 is the physical address PBA(N−1), and the physical address of the leading reserve block 43 in the reserve storage area 41 is the physical address PBAN. That is, the user information storage area 40 and the reserve storage area 41 are allocated as continuous storage areas, but this is not limitative.

Moreover, the reserve blocks 43 store invalid information indicating that the relevant reserve block 43 is not used ("NOU" shown FIG. 6), or store the physical addresses PBA of the initial defect blocks 421 (the physical addresses PBA3, 5, 7, 15, 20, 21, 27 in the example shown in FIG. 6). The information stored in the reserve blocks 43 only needs to be information by which the physical addresses PBA of the initial defect blocks 421 can be obtained.

The initial defect blocks 421 are detected through an inspection process for the memory 4 or the like, and each of the physical addresses PBA thereof is stored in any one of the reserve blocks 43. The physical addresses PBA of the detected initial defect blocks 421 are stored sequentially (in the order of smaller physical addresses PBA of the initial defect blocks 421) in the order of reading the reserve storage area 41 by the memory controller 5 described later (in the ascending order of the physical addresses PBA of the reserve blocks 43). Moreover, when the detection of all the initial defect blocks 421 has been finished, the invalid information NOU is stored in the remaining reserve blocks 43.

Referring back to FIG. 2, the memory controller 5 includes a computing device 50, a ROM 51 that stores a program 54, a controller memory 52 configured as an SRAM, and an interface 53 for connecting to the computer 2. The memory controller 5 accesses the memory 4 in response to an access request received from the computer 2.

The computing device 50 of the memory controller 5 operates in accordance with the program 54 stored in the ROM 51, and through computing operation, obtains the physical address PBA of the first block 42 to which an access request is made, from the logical address LBA included in the access request received from the computer 2, based on reference information 55 stored in the controller memory 52.

While a detailed description of the computing operation processing by the computing device 50 will be given later, the computing device 50 obtains the physical address PBA of the first block 42 to which the access request is made by "PBA=LBA+OFF . . . (Expression 1)" using the logical address LBA and an offset OFF.

The controller memory 52 is made up of storage elements (not shown) that can be accessed faster than the storage elements 60 making up the block 6 of the memory 4 (made of an SRAM), and stores the reference information 55 resulting from transferring the redundant information 44 stored in the reserve storage area 41. The reference information 55 stored in the controller memory 52 is referred to by the computing device 50. As the storage elements making up the controller memory 52, volatile storage elements are used to realize the high-speed access. As the volatile memory, in addition to the above-mentioned SRAM, a register, a flip-flop circuit or the like can be employed.

Figure 7:
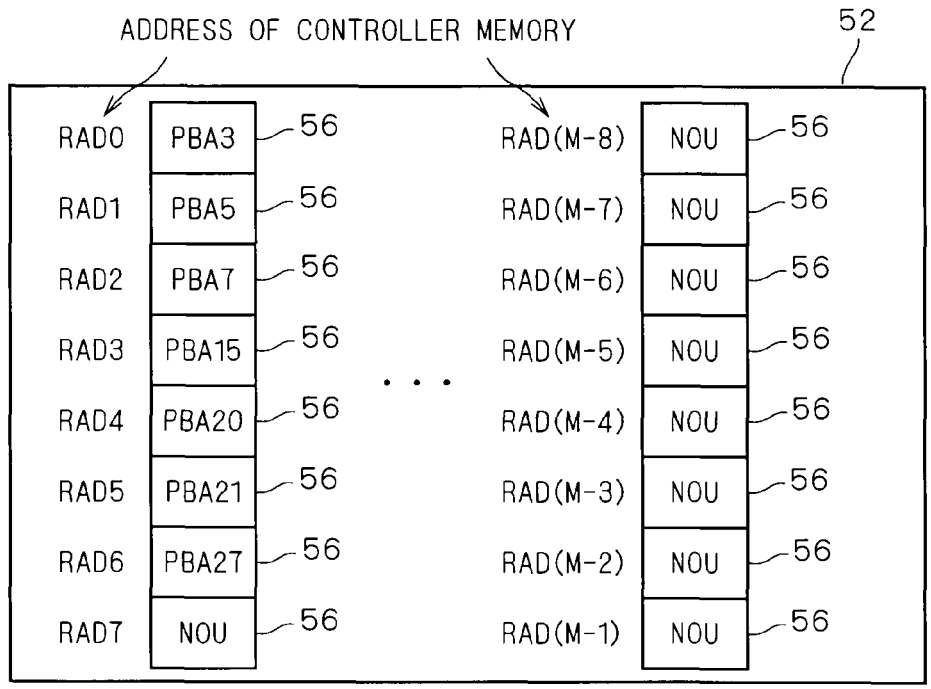
FIG. 7 is a diagram illustrating a status where redundant information is stored in a controller memory as reference information.

FIG. 7 is a diagram illustrating a status where the redundant information 44 shown in FIG. 6 is stored in the controller memory 52 as the reference information 55.

The controller memory 52 includes a plurality of (M) second blocks 56 that can store the information stored in the reserve blocks 43 (the first physical addresses of the initial defect blocks among the plurality of first blocks, respectively). To this plurality of second blocks 56 are assigned physical addresses RAD (second physical addresses) that do not overlap one another.

The computing device 50 of the memory controller 5 accesses the reserve blocks 43 in accordance with the order of the physical addresses PBA of the reserve storage area 41 when it transfers the redundant information 44 to the controller memory 52 to store the information stored in the relevant reserve blocks 43 (the physical addresses PBA of the initial defect blocks 421 or invalid information NOU) in the second blocks 56 in the order of the physical addresses RAD of the second blocks 56. That is, the computing device 50 also has a function as a transfer unit in the present invention. As seen from the foregoing, the reference information 55 is created on the controller memory 52 as the same information as the redundant information 44.

When by creating the above-described reference information 55, the physical address RAD of the second block 56 is subtracted from the physical address PBA of the initial defect block 421 stored in the relevant second block 56, a resultant value denotes the number of normal blocks 420 existing before the physical address PBA of the initial defect block 421 stored in the relevant second block 56 (the number of the first blocks other than the initial defect blocks).

The interface 53 is a section enabling the transmission and reception of data with respect to an interface of the computer 2.

Next, operation of the computer system 1 is described.

The memory controller 5 first determines whether or not the memory card 3 is powered on. Here, powering on the memory card 3 denotes starting supply of power to the memory card 3, and includes loading the memory card 3 on the computer 2, which has been powered on.

Once it is determined that the memory card 3 is powered on, the memory controller 5 (the computing device 50) accesses the reserve storage area 41 of the memory 4, reads the redundant information 44 stored therein, and starts the transfer of the read redundant information 44 to the controller memory 52. The information illustrated in FIG. 6 for the initial defect blocks is fixed to the product, and has been stored in the memory 4 before shipment of the product.

The memory controller 5 accesses the reserve blocks 43 making up the reserve storage area 41 in order from the leading reserve block 43 to the last so as to sequentially transfer the information stored in the accessed reserve blocks 43 to the second blocks 56. This allows the information equivalent to the information stored in the reserve storage area 41 shown in FIG. 6 to be stored in the controller memory 52, as shown in FIG. 7.

Thereafter, the computer 2 generates an access request and sends the same to the memory card 3. Here, the access request sent from the computer 2 includes the logical address LBA as described before. When the memory card 3 receives the access request (logical address LBA), the computing device 50 arithmetically operates the physical address PBA.

The relevant computing operation processing is described below. In the following description, the physical address RAD of the second block 56 that the computing device 50 notes is referred to as an "index I", and a value read from the second block 56 specified by the index I (noted second block 56) is referred to as an "RDV (I)". Moreover, among the plurality of second blocks 56, the second block 56 to find an offset OFF is referred to as a "target block".

In order to arithmetically operate expression 1, the computing device 50 needs to decide the offset OFF. The computing device 50 decides one target block for one logical address LBA to find the offset OFF by computing operation. In other words, the computing device 50 searches the target block from the plurality of second blocks 56 included in the controller memory 52 based on the logical address LBA to find the offset OFF.

First, the computing device 50 sets the index I to RAD0 (=0), and notes the leading second block 56 to arithmetically operate "RDV(I)−I=NUM . . . (Expression 2)".

Specifically, a value of NUM is a value obtained by subtracting the physical address RAD of the noted second block 56 from the physical address PBA of the initial defect block 421 stored in the noted second block 56, which has been specified by the current index I. This NUM, as described before, denotes the number of the normal blocks 420 (the number of the first blocks other than the initial defect blocks) existing before the initial defect block 421 specified by the physical address PBA stored in the noted second block 56.

Next, the computing device 50 determines the truth or false of "NUM>LBA . . . (Expression 3)".

If expression 3 is true, the second block 56 specified by the index I (physical address RAD0) is determined to be the target block.

On the other hand, if expression 3 is "false", as a technique of searching the target block from the plurality of second blocks 56, various variations are considered. Here, an example in which a kind of binary search method is used is described.

First, "n" is set in a counter, and the index I is updated so that the second block 56 located in the center is noted among the second blocks 56 remaining as candidates of the target block.

Here, when an even number of the second blocks 56 exist, the central second block 56 denotes the second block 56 having a larger value of the physical address RAD. For example, when four second blocks 56 specified by the physical addresses RAD0 to RAD3 remain as the candidates, the central second block 56 is the second block 56 specified by the physical address RAD2.

Once the index I is updated, the value of the counter is checked. If the value of counter is larger than "1", the computing device 50 again arithmetically operates expression 2 to determine the truth or false of expression 3.

If the determination result of expression 3 is "true", the second blocks 56 after the second block 56 indicated by the index I (including the second block 56 indicated by the index I) are excluded from the candidates of the target block. The counter is decremented, and then the processing returns to the above-described update processing of the index I.

On the other hand, if the determination result of expression 3 is "false", the second blocks 56 before the second block 56 indicated by the index I (including the second block 56 indicated by the index I) are excluded from the candidates of the target block. The counter is decremented, and then the processing returns to the above-described update processing of the index I.

In this manner, when there exist M(2ⁿ) second blocks 56, repeating the processing of excluding the unnecessary second blocks 56 from the candidates of the target block n−1 times allows the candidate of the target block to be narrowed down to one.

The operation of the above-described update processing of the index I and later is performed repeatedly, and once the value of the counter becomes "1" (the value of the counter is not larger than 1), the computing device 50 again arithmetically operates expression 2 to determine the truth or false of expression 3. This means that whether or not the first block 42 of a conversion destination is the initial defect block 421 is determined.

If "false" is determined in the true-false determination of expression 3, in order to shift the first block 42 of the conversion destination backward by one, the index I is incremented, so that the second block 56 specified by the index I is set as the target block.

On the other hand, if "true" is determined in the true-false determination of expression 3, the conversion destination is the normal block 420, and thus, the second block 56 indicated by the index I is set as the target block without incrementing the index I.

When the target block is decided in the foregoing, the computing device 50 arithmetically operates expression 1 with the index I (which is the physical address RAD specifying the target block) used as the offset OFF to obtain the physical address PBA.

Figure 8:
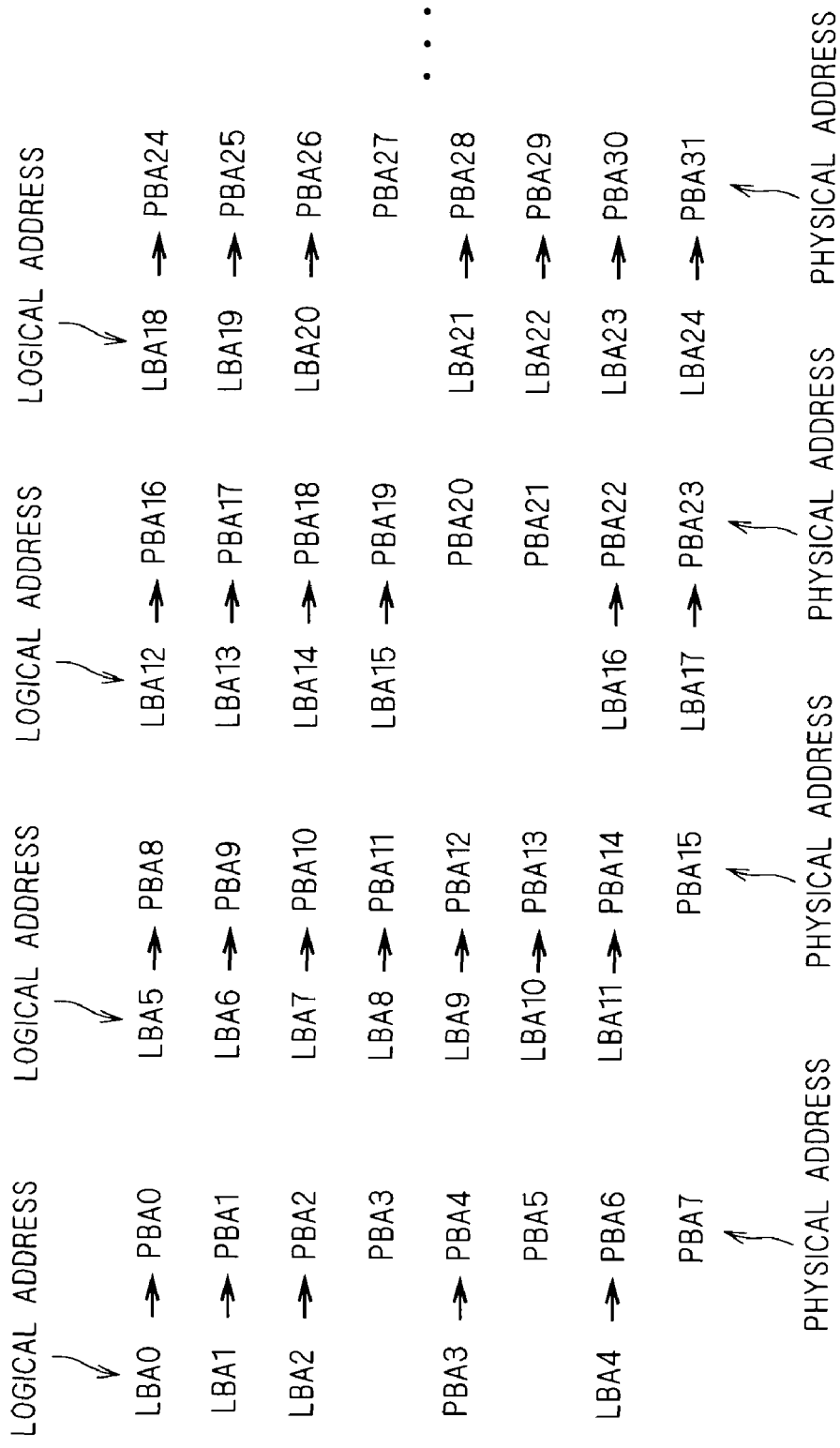
FIG. 8 is a diagram illustrating correspondence between logical addresses and physical addresses.

FIG. 8 is a diagram illustrating correspondence between the logical addresses LBA and the physical addresses PBA. FIG. 8 shows an example in which the initial defect blocks 421 exist as shown in FIG. 5. As described until now, finding the physical addresses PBA from the logical addresses LBA results in conversion relationships shown in FIG. 8 in computer system 1.

Here, taking, as an example, a case where N=32, $M=2^n=2^4=16$, and the initial defect blocks 421 exist as shown in FIG. 5, how the physical address PBA is found with respect to the logical address LBA5 is described.

First, when the logical address LBA5 is given, expression 3 becomes "false", so that the above-mentioned binary search method is executed and n(=4) is set in the counter. Furthermore, from $2^{4-1}+1=9$, the index I is set to "RAD($2^{4-1}$)" specifying the ninth second block 56 as the central second block 56.

In the physical address RAD($2^{4-1}$) (i.e., a physical address 8), NOU is stored. Here, if a sufficiently large value is employed for NOU, NUM obtained by expression 2 is a sufficiently large value, so that expression 3 is determined to be "true". Accordingly, the second blocks 56 after the physical address RAD8 are excluded from the candidates of the target block, and the value of the counter is decremented to "3".

Next, the index I is set to "RAD4" in the center of the remaining candidates. At this time, since the counter indicates "3", the value "3" of the counter is larger than "1". Accordingly, the computing device 50 again arithmetically operates expression 2. From expression 2, NUM=16 is obtained. Since the logical address currently given is "LBA5", the determination result of expression 3 is again "true". Accordingly, the physical addresses RAD4 to RAD7 are excluded from the candidates, and the value of the counter is decremented to "2".

Next, the index I is set to "RAD2" in the center of the remaining candidates. At this time, since the counter is "2", the value "2" of the counter is larger than "1". Accordingly, the computing device 50 again arithmetically operates expression 2. From expression 2, NUM=5 is obtained, and the determination result of expression 3 becomes "false".

Accordingly, the physical addresses RAD0 to RAD2 are excluded from the candidates, and the value of the counter is decremented to "1".

Next, the index I is set to "RAD3", and at this time, the candidate is narrowed down to one, that is, the second block 56 specified by the address RAD3, and the value of the counter is "1". Accordingly, from expression 2, NUM=12 is obtained, and the determination result of expression 3 becomes "true". Accordingly, the physical address of the target block is decided to be the physical address RAD3, and the offset OFF is "3".

Accordingly, from expression 1, 5+3=8 is obtained, and the logical address LBA5 is converted to the physical address PBA8. That is, the first block 42 accessed by the logical address LBA5 is found to be the first block 42 specified by the physical address PBA8.

Once the physical address PBA is found from the received logical address LBA by the computing device 50, the memory controller 5 accesses the memory 4 based on the found physical address PBA.

At this time, when the access request is for writing processing, the memory 4 is controlled so as to write user data in the first block 42 specified by the found physical address PBA. On the other hand, when the access request is for reading processing, the memory 4 is controlled so as to read use data stored in the first block 42 specified by the found physical address PBA. The read user data is transferred to the computer 2 through the interface.

The foregoing description is logical-physical conversion description when only initial defect blocks exist and no late defective blocks attributed to the read disturb or the like exist in the memory 4 (hereinafter, for convenience, the logical-physical conversion processing described until now is referred to as first logical-physical conversion processing).

In respective embodiments described later, logical-physical conversion processing when late defective blocks occur in the memory 4 after shipment is described.

Hereinafter, this invention is specifically described based on the drawings showing the embodiments.

First Embodiment

In the present embodiment, a description is given of logical-physical conversion processing when after the above-described situation where no late defective block has occurred yet, a plurality of access requests to the memory 4 (e.g., reading requests) cause a tentative late defective block due to the read disturb phenomenon.

Figure 9:
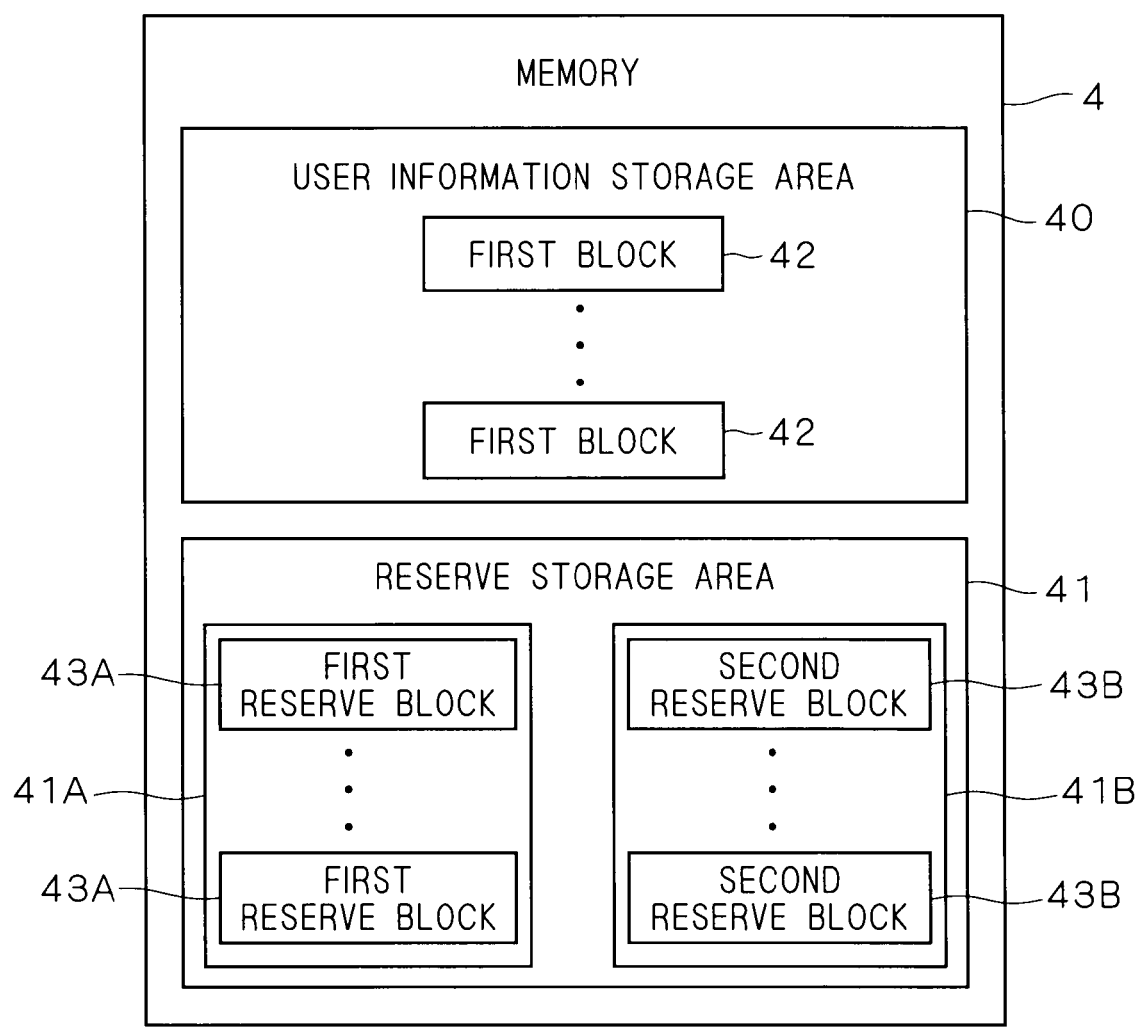
FIG. 9 is a schematic diagram showing an internal structure of a memory.

FIG. 9 is a diagram showing a configuration of the memory 4 according to the present embodiment.

As shown in FIG. 9, the reserve storage area 41 in the memory 4 has two management areas 41A, 41B. A configuration of the user information storage area 40 in FIG. 9 is the same as the configuration of the user information storage area 40 shown in FIG. 3. In the present embodiment, however, as will be described later, user information and duplicated use information are stored in the user information storage area 40. The first management area 41A in FIG. 9 is an area for individually storing/managing first physical address information of the initial defect blocks out of the first blocks 42 (see FIG. 6). The second management area 41B in FIG. 9 is an area for individually storing/managing first physical address information of permanent late defective blocks out of the first blocks 42.

In the respective closed areas in the areas 40, 41A, 41B, a plurality of blocks 42, 43A, 43B are provided, and in the relevant closed areas, physical addresses of serial numbers are given to the respective blocks 42, 43A, 43B. Here, the respective blocks making up the first management area 41A are the first reserve blocks 43A, and the respective blocks making up the second management area 41B are the second reserve blocks 43B.

To respective first reserve blocks 43A are assigned physical addresses of serial numbers that do not overlap one another. Also, to the respective second reserve blocks 43B are assigned physical addresses of serial numbers that do not overlap one another.

As described using FIG. 6, the initial defect blocks are detected through the inspection process or the like for the memory 4, and the physical addresses thereof are stored in the first reserve blocks 43A. The first physical addresses of the detected initial defect blocks are stored sequentially (in the order of the smaller first physical addresses of the initial defect blocks) in the order of reading the reserve storage areas 41 by the memory controller 5 (in the ascending order of the physical addresses of the first reserve blocks 43A). That is, as the physical address of the first reserve block 43A is ascending, the first physical address of the initial defect block stored in each of the first reserve blocks 43A is ascending. Moreover, when the detection of all the initial defect blocks ends, the valid information NOU is stored in the remaining first reserve blocks 43A.

The permanent late defective blocks are detected during use of the memory 4, and the first physical addresses thereof are stored in the second reserve blocks 43B. The first physical addresses of the detected permanent late defective blocks are stored sequentially (in the order of the first physical addresses of the permanent late defective blocks in the order of occurrence of the permanent late defects) in the order of reading the reserve storage area 41 by the memory controller 5 (in the ascending order of the physical addresses of the second reserve blocks 43B). That is, as the physical address of the second reserve block 43B is ascending, the first physical addresses of the permanent late defective blocks are stored in the respective second reserve blocks 43B in the order of occurrence of the permanent late defective blocks. Moreover, in the second reserve blocks 43B in which no first physical addresses of the permanent late defective blocks are stored, invalid information NOU is stored.

For the detection of the permanent late defective blocks, for example, the memory controller 5 accesses the given first block 42 of the memory 4, and as a result of the access to the given first block 42, receives, from the memory 4, a signal indicating that reading/writing or the like did not normally end, and data restore (refresh) did not succeed either to thereby detect the relevant permanent late defective block. After the detection, the memory controller 5 records the first physical address of the given first block 42 on the second management area 41B of the memory 4 directly or through the controller memory 52.

Suppose in the present stage, there has not yet occurred any permanent late defective block in the first blocks 42, and only the initial defect blocks have occurred. Accordingly, in the second reserve blocks 43B making up the second management area 41B, the first physical address information has not been stored yet, and the invalid information NOU is stored in all the second reserve blocks 43B.

Under the above-described premise, when the memory card 3 is powered on as described above, the memory controller 5 (computing device 50) accesses the reserve storage area 41 of the memory 4 to read the redundant information 44 stored therein, and start transfer of the read redundant information 44 to the controller memory 52.

As will be described later, the information of the first physical addresses of the initial defect blocks stored in the first management area 41A, and the information of the first physical addresses of the permanent late defective blocks stored in the second management area 41B are updated in accordance with the use situation of the memory 4 (that is, the physical addresses of the permanent late defective blocks are recorded as needed).

The memory controller 5 (computing device 50) accesses the first reserve blocks 43A making up the first management area 41A in order from the leading first reserve block 43A to the last to sequentially transfer the information stored in the accessed first reserve blocks 43A to second blocks 52$ba$ described later (see FIG. 10). This allows information equivalent to the information stored in the first management area 41A to be stored in the controller memory 52 as the reference information 55. That is, as second physical addresses I_RAD0 to I_RAD7 of the second blocks 52$ba$ are ascending, the first physical addresses of the initial defect address stored the respective second blocks 52$b$ are ascending.

Moreover, the memory controller 5 (computing device 50) accesses the second reserve blocks 43B making up the second management area 41B in order from the leading second reserve block 43B to the last to sequentially transfer the information stored in the accessed second reserve blocks 43B to fourth blocks 52$bb$ described later (see FIG. 10). This allows information equivalent to the information stored in the second management area 41B to be stored in the controller memory 52 as the reference information 55. That is, as fourth physical addresses FA_RAD0 to FA_RAD3 of the fourth blocks 52$bb$ are ascending, the first physical addresses of the permanent late defective blocks are stored in the respective fourth blocks 52$bb$ in the order of occurrence of the permanent late defective blocks in the memory 4.

FIG. 10 is a diagram illustrating a status where the redundant information 44 is stored in the controller memory 52 as the reference information 55.

A first management area 52I in the controller memory 52 is made up of the plurality of second blocks 52$ba$. Here, in the first management area 52I, the physical addresses (second physical addresses) I_RAD to I_RAD7 of the second blocks 52$ba$ in the controller memory 52 are serial numbers.

A second management area 52FA in the controller memory 52 is made up of the plurality of fourth blocks 52$bb$. Here, in the second management area 52FA, the physical addresses (fourth physical addresses) FA_RAD0 to FA_RAD3 of the fourth blocks 52$bb$ in the controller memory 52 are serial numbers.

To the second blocks are assigned the second physical addresses I_RAD0 to I_RAD7 that do not overlap one another, respectively, and to the fourth blocks are assigned the fourth physical addresses FA_RAD0 to FA_RAD3 that do not overlap one another, respectively.

As seen from the above-described transfer processing, the plurality of second blocks 52$ba$ are provided to store the first physical addresses of the initial defect blocks out of the plurality of first blocks 42, respectively. Moreover, the plurality of fourth blocks are provided to store the first physical addresses of the permanent late defective blocks out of the plurality of the first blocks 42, respectively.

As a result of the above-described transfer, as illustrated in FIG. 10, as the second physical address of the second block 52$ba$ is ascending (I_RAD0→I_RAD1 . . . → I_RAD6→I_RAD7), the (first) physical address of the initial defect address stored in each of the second blocks 52$ba$ is ascending (PBA3→PBA5 . . . →PBA21→PBA27). The invalid information "NOU", which means that the relevant block is unused, is stored in the unused blocks 52*ba*.

Moreover, as the fourth physical address of the fourth block 52*bb* is ascending (FA_RAD0→FA_RAD1→FA_RAD2→FA_RAD3), the (first) physical addresses of the relevant permanent late defective blocks are stored in the respective fourth blocks 52*bb* in the order of occurrence of the permanent late defective blocks in the memory 4. As described above, at the present stage, the permanent late defective blocks have not occurred in the first blocks 42, yet. Accordingly, in all the fourth blocks 52*bb*, the invalid information "NOU", which means that the relevant block is not used, is stored.

Figure 16:
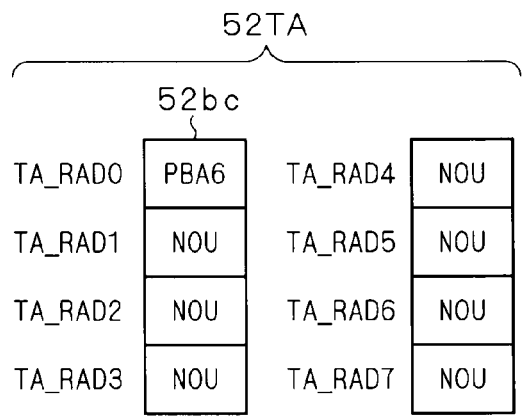
FIG. 16 is a diagram illustrating a structure of information stored in a third management area as reference information.

Moreover, in the present embodiment, the controller memory 52 has a third management area 52TA separately from the first and second management areas 52I, 52FA as shown in FIG. 16, although it is not illustrated in FIG. 10. Here, the third management area 52TA is made up of a plurality of third blocks 52*bc*. In the third management area 52TA, physical addresses (third physical addresses) of the third blocks 52*bc* in the controller memory 52 TA_RAD0 to TA_RAD7 are serial numbers. To the third blocks 52*bc* are assigned the third physical addresses TA_RAD0 to TA_RAD7 that do not overlap one another, respectively.

The plurality of third blocks 52*bc* are provided to store the first physical addresses of tentative late defective blocks out of the plurality of first blocks 42, respectively. Moreover, as the third physical address of the third block 52*bc* is ascending (TA_RAD0→TA_RAD1 . . . →TA_RAD6→TA_RAD7), the (first) physical addresses of the relevant tentative late defective blocks are stored in the respective third blocks 52*bc* in the order of occurrence of the tentative late defective blocks in the memory 4. The invalid information "NOU", which means that the relevant block is unused, is stored in the unused blocks 52*bc*.

FIG. 11A is a diagram schematically illustrating a logical space. FIG. 11B is a diagram schematically illustrating a physical space before the occurrence of the late defective blocks (that is, in the status where only the initial defect blocks have occurred).

In FIG. 11B, the user information storage area 40 of the memory 4 is made up of the 32 first blocks 42. In the respective first blocks 42, the first physical addresses PBA0 to PBA31 are set in the ascending order. In FIG. 11A, the same number of logical addresses LBA0 to LBA31 as the number of the first blocks 42 (=32) are set in the ascending order.

In the user information storage area 40 of the memory 4, the user information and duplicated user information are stored, and in the example of FIGS. 11A and 11B, a data amount of the user information is equivalent to 10 of the first blocks 42. Since the duplicated user information is a duplicate of the user information, a data amount of the duplicated user information is also equivalent to 10 of the first blocks 42.

Accordingly, in FIG. 11A, the logical addresses LBA0 to LBA9 equivalent to the 10 blocks for accessing the user information are set in the ascending order. Also, the logical addresses LBA10 to LBA19 equivalent to the 10 blocks for accessing the duplicated user information are set in the ascending order. The area where the logical addresses LBA10 to LBA19 are set is referred to as a "logical mirror area". The logical addresses LBA10 to LBA19 belonging to the logical mirror area are especially referred to as mirror logical addresses.

The respective logical addresses LBA0 to LBA9 have one-on-one relationships with the respective mirror logical addresses LBA10 to LBA19. For example, the logical address LBA0 has a one-on-one relationship with the mirror logical address LBA10, the logical address LBA1 has a one-one-one relationship with the mirror logical address LBA11, and the logical address LBA2 has a one-on-one relationship with the mirror logical address LBA12. That is, the one-on-one relationships between the logical addresses and the mirror logical addresses are established in accordance with the ascending order of the logical address (see a correspondence table between the logical addresses and the mirror logical addresses in FIG. 12).

As seen from the foregoing, a leading position of the logical mirror area is decided by the data amount of the user information. In FIG. 11A, the remaining logical addresses LBA20 to LBA31 are unused logical addresses.

On the other hand, in FIG. 11B, the respective first blocks 42 are made up of normal blocks and the initial defect blocks. In the normal blocks, for convenience, the corresponding logical addresses are described. Moreover, in the initial defect blocks (PBA3, PBA5, PBA7, PBA15, PBA20, PBA21, PBA27), for convenience, "Initial Bad" is described. As a result of the above-described first logical-physical conversion processing, relationships between the first physical addresses and the logical addresses shown in FIG. 11B are established. The logical addresses correspond to the respective first physical addresses in the ascending order with the initial defect blocks skipped.

In FIG. 11B, the user information equivalent to the 10 blocks is stored in the normal blocks specified by the first physical addresses PBA0 to PBA12 with the initial defect blocks skipped. Moreover, the duplicated user information equivalent to the 10 blocks is stored in the normal blocks specified by the first physical addresses PBA13 to PBA25 with the initial defect blocks skipped. The block area where the duplicated user information is stored is referred to as a "physical mirror area".

As seen from the foregoing, in the first physical addresses PBA0 to PBA31 set in the ascending order, a leading position of the physical mirror area is decided by the data amount of the user information and the number of the initial defect blocks (three in FIG. 11B) which have occurred from the first block 42 with the first data of the user information stored to the first block 42 with the last data of the user information stored. In the example of FIGS. 11A and 11B, the first blocks 42 specified by the first physical addresses PBA26 to PBA31 are unused blocks. Moreover, out of the plurality of first blocks 42, the plurality of first blocks in which the user information is stored are referred to as "user information blocks". Moreover, out of the plurality of first blocks 42, the plurality of first blocks in which the duplicated user information is stored are referred to as "duplicated user information blocks".

A so-called mirror relationship is established between the data stored in the user information blocks and the data stored in the duplicated user information blocks. For example, the data stored in the user information block of the physical address PBA0 has the same contents as those of the data stored in the duplicated user information block of the physical address PBA13. The data stored in the user information block of the physical address PBA1 has the same contents as those of the data stored in the duplicated user information block of the physical address PBA14. The data stored in the user information block of the physical address PBA2 has the same contents as those of the data stored in the duplicated user information block of the physical address PBA16. The data stored in the user information block of the physical address PBA4 has the same contents as those of the data stored in the duplicated user information block of the physical address PBA17. As to the subsequent data, the correspondence relationship can be speculated from the foregoing. In FIG. 13, the relationships between the user information blocks and the duplicated user information blocks, which share the same data, are expressed using the first physical addresses.

According to the example of FIGS. 11A and 11B, the first physical addresses PBA3, PBA5, PBA7, PBA15, PBA20, PBA21, PBA27 of the initial defect blocks are stored in the ascending order in the second blocks 52ba of the first management area 52I shown in FIG. 10.

Suppose after the above-described transfer of the information to the controller memory 52, the computer 2 generates an access request and sends the same to the memory card 3. Here, as described before, a logical address LBA is included in the access request sent from the computer 2. When the memory card 3 receives the access request (logical address LBA), the computing device 50 arithmetically operates the first physical address PBA by the above-described first logical-physical conversion processing.

Suppose a reading access is performed several times to the information in the given user information block 42 in the memory 4. As a result, a bit error occurs in the given user information block 42, which increases the bit errors in number. When the number of bit errors exceeds a threshold value set in advance, the given user information block 42 is dealt with as a tentative late defective block. Here, as the threshold value, for example, a value of "(error correction ability of the memory controller 5)−1" can be employed.

Figure 14:
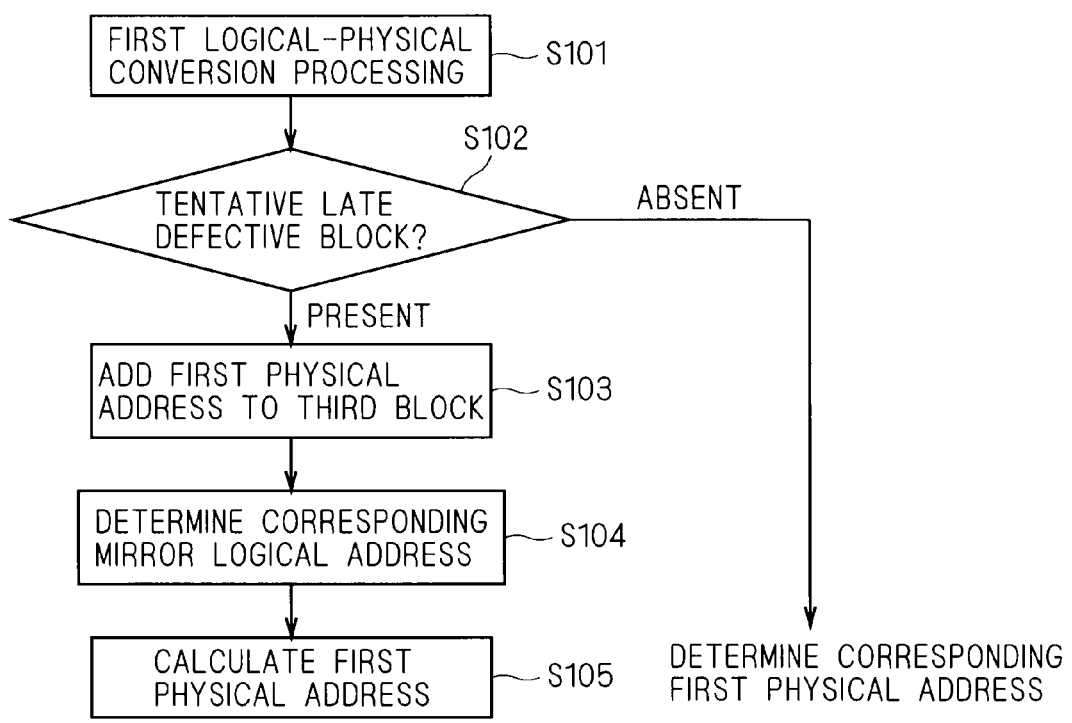
FIG. 14 is a flowchart for explaining the logical-physical conversion processing operation according to the first embodiment.

The logical-physical conversion processing after the occurrence of the tentative late defective block is described using a flowchart of FIG. 14. More specifically, operation of the computing device 50 to find the first physical address corresponding to the given logical address based on the given mirror logical address corresponding to the inputted given logical address and the information stored in the second block 52ba is described, using FIG. 14.

Here, the computing device 50 has, as the information, the mirror logical addresses LBA 10 to LBA19 for accessing the duplicated user information blocks, which have the one-on-one correspondence relationships with the logical addresses LBA0 to LBA9 inputted to access the user information blocks 42 (FIG. 12).

Suppose the computer 2 sends the memory card 3 an access request (e.g., a reading request) including the logical address LBA4. In this case, the computing device 50 calculates the first physical address PBA6 corresponding to the logical address LBA4 by the above-described first logical-physical conversion processing using the logical address LBA4 and the information of the first management area 52I in the controller memory 52 (information stored in the second blocks 52ba) (step S101).

Next, the computing device 50 determines whether or not the first block specified by the first physical address PBA6 found in step S101 is a tentative late defective block attributed to, for example, the read disturb phenomenon (step S102).

The computing device 50 measures the number of bit errors of the user information block 42 specified by the first physical address PBA6 found in step S101. When the measurement result exceeds the threshold value set in advance, the computing device 50 determines the user information block 42 specified by the first physical address PBA6 to be a tentative late defective block ("present" in step S102).

Figure 15:
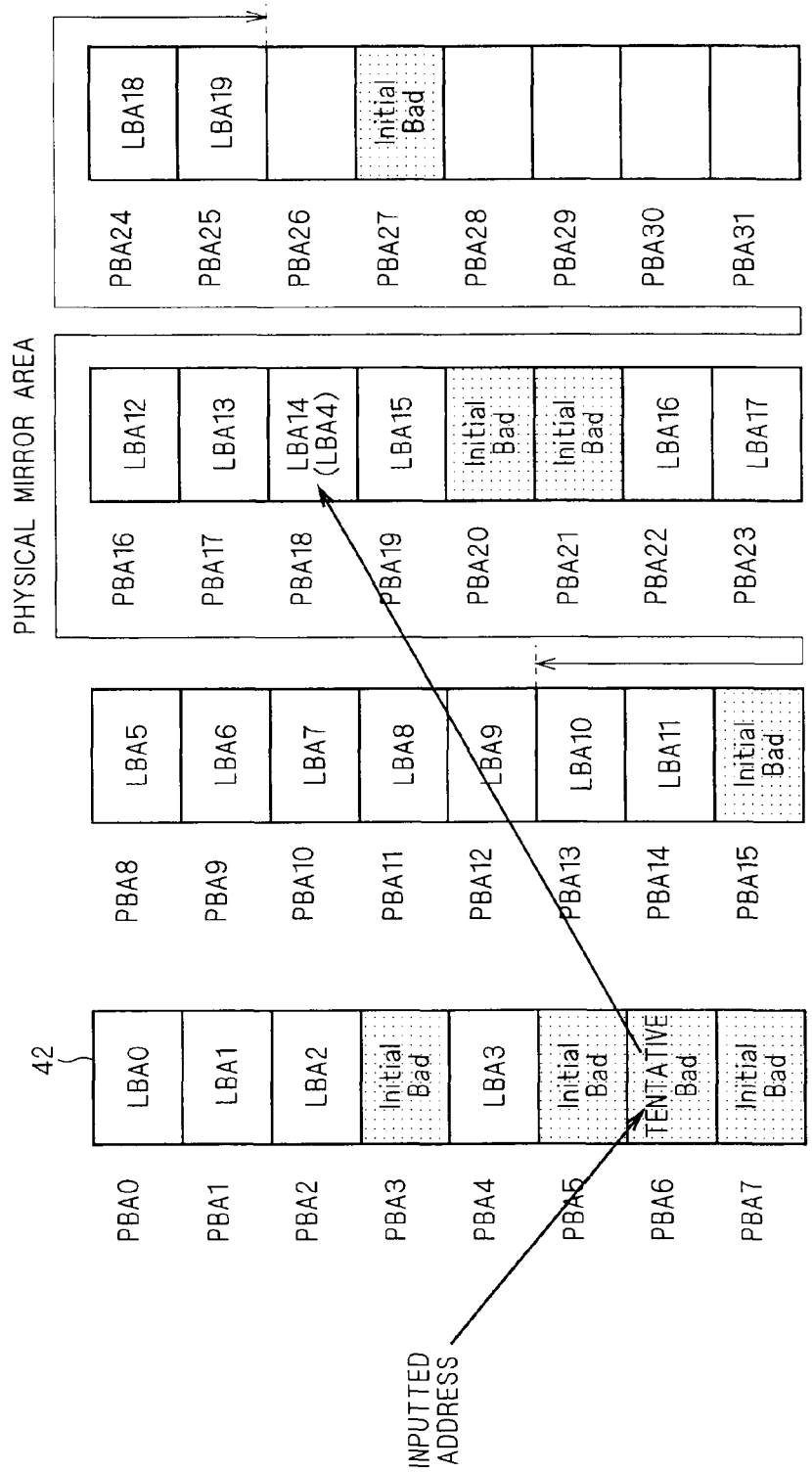
FIG. 15 is a diagram showing correspondence between the logical addresses and the physical addresses, and the logical-physical conversion.

In the description of the present embodiment, suppose, as shown in FIG. 15, in the user information block 42 specified by the first physical address PBA6, the tentative late defective block occurs (in FIG. 15, the block in which the tentative late defect has occurred is expressed with "tentative Bad" for convenience). Accordingly, in the description here, "present" in step S102 allows the computing device 50 to shift to processing in step S103.

In contrast to the description here, suppose the measurement number of the bit errors of the user information block 42 specified by the first physical address is the threshold value set in advance or less. In this case, the computing device 50 determines the user information block 42 specified by the relevant first physical address not to be the tentative late defective block ("absent" in step S102). Accordingly, in this case, the computing device 50 decides the first physical address calculated in step S101 as the first physical address corresponding to the inputted logical address.

When the relevant first block is determined to be the tentative late defective block in step S102, the computing device 50 records the first physical address PBA6 found in step S101 on the third block 52bc as shown in FIG. 16 (step S103). At a next access or later, the computing device 50 determines whether or not the first physical address found in step S101 is stored in the third block 52bc with reference to FIG. 16. If the first physical address is not stored, the computing device 50 makes an access to the first physical address found in step S101. On the other hand, if it is stored, the computing device 50 executes steps S104, S105 described later without carrying out step S103.

After step S103, the computing device 50 decides the mirror logical address LBA14 corresponding to the logical address LBA4 based on the correspondence relationships shown in FIG. 12 set in advance (step S104).

Next, the computing device 50 calculates the first physical address corresponding to the mirror logical address LBA14 (in other words, the inputted logical address LBA4) by the above-described first logical-physical conversion processing (however, the mirror logical address needs to be read in place of the logical address), using the mirror logical address LBA14 decided in step S104 and the information of the first management area 52I in the controller memory 52 (information stored in the second blocks 52ba) (step S105).

When the above-described first logical-physical conversion processing is applied, the first physical address is "PBA18" (see FIG. 15). Here, as shown in FIG. 13, in the duplicated user information block 42 of the first physical address PBA18, the duplicated data of the user information stored in the user information block 42 of the first physical address PBA6 is stored.

The memory controller 5 makes the access to the duplicated user information block 42 of the first physical address PBA18 decided in the foregoing.

As described above, in the present embodiment, the computing device 50 finds the first physical addresses PBA13 to PBA19 corresponding to the given logical addresses LBA0 to LBA9, based on the given mirror logical addresses LBA10 to LBA19 corresponding to the inputted given logical addresses LBA0 to LBA9, and the information stored in the second blocks 52ba.

In this manner, in the case where the mirror area is provided, and the tentative late defective block has occurred due to the "read disturb" phenomenon, the logical-physical conversion processing is carried out to enable the access to the mirror area. Accordingly, the memory system and the computer system can be provided, in which data reading processing is not affected even if the tentative late defective block has occurred due to the "read disturb" phenomenon.

Moreover, the memory system (memory card 3) and the computer system 1 can be provided, in which it is not necessary to change the correspondence relationships of the logical-physical conversion across many blocks even if the late defect has occurred in the memory.

Moreover, in the present embodiment, to the second blocks 52*ba* are assigned the second physical addresses I_RAD0 to I_RAD7 that do not overlap one another, respectively, and the first physical addresses PBA3, PBA5, PBA7, PBA15, PBA20, PBA21, PBA27 of the initial defect blocks to be stored in the second blocks 52*ba* are stored in the second blocks 52*ba* in the order of the second physical addresses I_RAD0 to I_RAD6 in accordance with the order of the first physical address.

Accordingly, the number of the second block 52*ba* necessary for finding the first physical address can be reduced.

Moreover, in the present embodiment, the computing device 50 finds the first physical address corresponding to the logical address by the above-described first logical-physical conversion processing.

Accordingly, the physical addresses of the first blocks 42 other than the initial defect blocks need not be stored. Alternatively, properties (presence or absence of the defect) relating to all the blocks, and the physical addresses of transfer destinations need not be stored. Accordingly, the number of the second blocks 52*ba* can be reduced.

Moreover, in the present embodiment, when the computing device 50 determines the first block 42 specified by the first physical address found in step S101 to be a tentative late defective block (step S102), it performs the processing described in steps S103 to S105.

Accordingly, the first physical address found in step S101 can be prevented from being accessed, and also, whether or not to perform further logical-physical conversion processing can be determined. Moreover, even if any late defect has occurred in the memory, the system in which it is unnecessary to change the correspondence relationships of the logical-physical conversion across many blocks can be realized in the easy method.

Moreover, in the present embodiment, the plurality of third blocks 52*bc* provided to respectively store the first physical addresses of the tentative late defective blocks out of the plurality of first blocks 42 are further included, so that the computing device 50 records the first physical address found in step S101 on the third block 52*bc*.

Accordingly, the subsequent logical-physical conversion processing can be performed dynamically, based on the updated information of the third blocks 52*bc*.

Moreover, in the present embodiment, the second blocks, the third blocks, the fourth blocks and the like are held in the controller memory 52 made of a nonvolatile memory (e.g., an SRAM, a register, flip-flop circuit or the like). Accordingly, the computing device 50 can access the second blocks, the third blocks, and the fourth blocks at a high speed. Thus, increase in speed of the logical-physical conversion processing is enabled.

Second Embodiment

Figure 17:
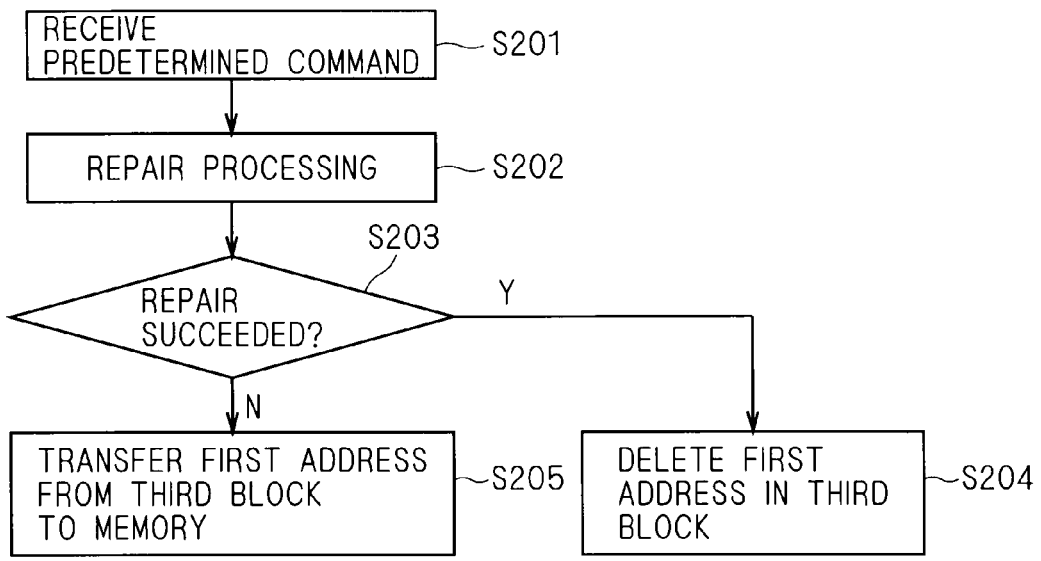
FIG. 17 is a flowchart for explaining operation according to a second embodiment.

In the present embodiment, a description is given of repair processing (refresh processing) for the first block (user information block) 42 that is determined to be the tentative late defective block in the first embodiment. FIG. 17 is a flowchart showing operation of the computer system 1 according to the present embodiment.

Suppose while the power ON status in the memory card 3, which has been described in the first embodiment, is continuing, the memory card 3 receives, from the computer 2, a predetermined command that enables the memory card 3 to secure an idling period in the relationship with the computer 2 (step S201). When the memory card 3 receives the predetermined command, the memory controller 5 (e.g., the computing device 50) carries out the repair processing to the tentative late defective block (step S202).

Specifically, the memory controller 5 (e.g., the computing device 50) repairs the user information block 42 determined to be the tentative late defective block in step S102, using the information in the duplicated user information block corresponding the relevant user information block. Here, the correspondence relationships between the user information blocks and the duplicated information blocks are as shown in FIG. 13. Accordingly, for example, when the repair processing of the user information block 42 of the first physical address PBA6 is performed, the computing device 50 copies the information in the duplicated user information block 42 of the first physical address PBA18 to the relevant user information block 42.

Suppose the repair processing to the user information block 42 that was the tentative late defective block (PBA6) ends normally ("Y" in step S203). In this case, the computing device 50 deletes, from the relevant third block 52*bc*, "PBA6", which is the first physical address information of the block, which has been stored in the third block 52*bc*, and for which the repair has been completed (step S204).

In contrast, suppose the repair processing to the user information block 42 which is the tentative late defective block (PBA6) does not end normally (that is, the computing device 50 determines that it is beyond repair. "N" in step S203). In this case, the computing device 50 transfers from the third block 52*bc* to the memory 4 (more specifically, the second reserve management area 41B), "PBA6", which is the first physical address information of the first block that is a repair processing subject stored in the third block 52*bc*, and is determined to be beyond repair (step S205). The information of the PBA6 is stored in the leading second reserve block 43B in which the first address has not been stored yet, as the information relating to the permanent late defective block. Moreover, the following flow is considered to be more general as a flow different from the foregoing.

Specifically, suppose repair processing does not end normally as in the foregoing ("N" in step S203). In this case, the computing device 50 stores "PBA6", which is the first physical address information of the first block that is the repair processing subject stored in the third block 52*bc* and is determined to be beyond repair, in the fourth block 52*bb* that manages the physical address information of the permanent late defective block. Moreover, before or after, or simultaneously with, the relevant storing processing, the computing device 50 transfers "PBA6", which is the first physical address information, from the third block 52*bc* to the memory 4 (more specifically the second reserve management area 41B). The computing device 50 then deletes "PBA6", which is the first physical address information, from the third block 52*bc*. Here, the information of the PBA6 is stored, as the information relating to the permanent late defective block, in the leading fourth block 52*bb* and the leading second reserve block 43B, in each of which the first address has not been stored yet.

As described above, in the present embodiment, the computing device 50 repairs the first block 42 determined to be the tentative late defective block, using the information in the duplicated user information block corresponding to the relevant first block 42 (step S202).

Accordingly, the data repair of the tentative late defective block is enabled, so that access to the first block 42 after the repair can be restarted.

Moreover, in the present embodiment, when the tentative late defective block is beyond repair, the computing device 50 transfers the address information of the relevant tentative late defective block beyond repair as the information relating to the permanent late defective block from the third block 52$bc$ to the second reserve management area 41B made up of a part of the first blocks 42 (step S205).

Accordingly, the first physical address information of the first block 42 determined to be beyond repair can be saved in the management area as backup and as the information indicating that it is the permanent late defective block.

Third Embodiment

In the first embodiment, the case where the number of (physical and logical) mirror areas is one has been described. That is, only one duplicate of the user information is prepared. In contrast, in a third embodiment, a case where there are a plurality of (physical and logical) mirror areas is described. That is, a plurality of duplicates of the user information are prepared. In the present embodiment, for simplification of the description, a case where the number of the (physical and logical) mirror areas is two is described.

FIG. 18A is a diagram schematically illustrating a logical space. Moreover, FIG. 18B is a diagram schematically illustrating a physical space before a late defective block occurs (that is, only the initial defect blocks have occurred).

In FIG. 18B, the user information storage area 40 of the memory 4 is made up of the 16 first blocks 42. In the respective first blocks 42, the first physical addresses PBA0 to PBA15 are set in the ascending order. In FIG. 18A, the same number of logical addresses LBA0 to LBA15 as the number of the first blocks 42 (=16) are set in the ascending order.

In the user information storage area 40 of the memory 4, the user information and the duplicated user information are stored, and in the example of FIGS. 18A and 18B, the data amount of the user information is equivalent to three of the first blocks 42. Since the duplicated user information is a duplicate of the user information, the data amount of the duplicated user information is also equivalent to three of the first blocks 42. In the present embodiment, two sets of the duplicated user information each equivalent to the three blocks exist.

Accordingly, in FIG. 18A, the logical addresses LBA0 to LBA2 equivalent to the three blocks for accessing the user information are set in the ascending order. Also, the logical addresses LBA3 to LBA5 equivalent to the three blocks for accessing first duplicated user information are set in the ascending order. Moreover, the logical addresses LBA6 to LBA8 equivalent to the three blocks for accessing second duplicated user information are set in the ascending order.

The area where the logical addresses LBA3 to LBA5 are set is referred to as a "first logical mirror area". The area where the logical addresses LBA6 to LBA8 are set is referred to as a "second logical mirror area". The logical addresses LBA3 to LBA5 belonging to the first logical mirror area are especially referred to as first mirror logical addresses. Moreover, the logical addresses LBA6 to LBA8 belonging to the second logical mirror area are especially referred to as second mirror logical addresses.

The logical addresses LBA0 to LBA2 have one-on-one relationships with the first mirror logical addresses LBA3 to LBA5 (see FIG. 19). Also, the logical addresses LBA0 to LBA2 have one-on-one relationships with the second mirror logical addresses LBA6 to LBA8 (see FIG. 19). The correspondence relationships shown in FIG. 19 are set as information in the computing device 50.

In FIG. 18A, the remaining logical addresses LBA9 to LBA15 are unused logical addresses.

On the other hand, in FIG. 18B, as described in the first embodiment (FIG. 11B), the respective first blocks 42 are made up of normal blocks and the initial defect blocks. As a result of the above-described first logical-physical conversion processing, relationships between the first physical addresses and the logical addresses shown in FIG. 18B are established. The logical addresses correspond to the respective first physical addresses in the ascending order with the initial defect blocks skipped.

In FIG. 18B, the user information equivalent to the three blocks is stored in the normal blocks specified by the first physical addresses PBA0 to PBA3 with the initial defect block skipped. Moreover, the first duplicated user information equivalent to the three blocks is stored in the normal blocks specified by the first physical addresses PBA4 to PBA8 with the initial defect blocks skipped. Also, the second duplicated user information equivalent to the three blocks is stored in the normal blocks specified by the first physical addresses PBA9 to PBA11. The block area where the first duplicated user information is stored is referred to as a "first physical mirror area". Moreover, the block area where the second duplicated user information is stored is referred to as a "second physical mirror area".

In the example of FIGS. 18A and 18B, the first blocks 42 specified by the first physical addresses PBA12 to PBA15 are unused blocks. Moreover, out of the plurality of first blocks 42, the plurality of first blocks in which the user information is stored are referred to as "user information blocks". Moreover, out of the plurality of first blocks 42, the plurality of first blocks in which the first duplicated user information is stored are referred to as "first duplicated user information blocks". Further, out of the plurality of first blocks 42, the plurality of first blocks in which the second duplicated user information is stored are referred to as "second duplicated user information blocks".

A so-called mirror relationship is established between the data stored in the user information blocks 42 and the data stored in the first duplicated user information blocks 42 (see FIG. 20). Also, a so-called mirror relationship is established between the data stored in the user information blocks 42 and the data stored in the second duplicated user information blocks 42 (see FIG. 20). For example, the data stored in the user information block 42 of the physical address PBA0 has the same contents as those of the data stored in the first and second duplicated user information blocks 42 of the physical addresses PBA4, PBA9. The data stored in the user information block 42 of the physical address PBA3 has the same contents as those of the data stored in the first and second duplicated user information blocks 42 of the physical addresses PBA8, PBA11.

Figure 21:
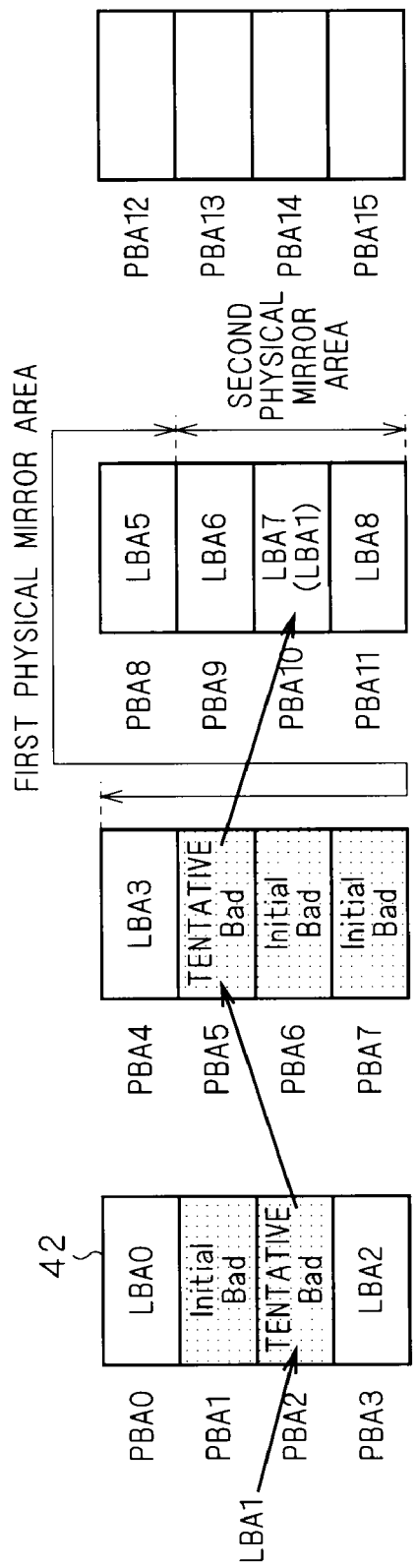
FIG. 21 is a diagram showing correspondence between the logical addresses and the physical addresses, and the logical-physical conversion.

Suppose in the above-described configuration, an access request including the logical address LBA1 is inputted to the memory card 3, and the above-described first logical-physical conversion processing is performed in the computing device 50, and as a result, "PBA2" is specified as the first physical address. Further, suppose, thereafter, as described in the first embodiment as well, a tentative late defect has occurred in the user information block 42 specified by the first physical address PBA2 (see FIG. 21). In this case, as a result of the operation described in the first embodiment (see FIG. 14), when the logical address LBA1 is inputted after the relevant tentative late defect has occurred, the memory controller 5 accesses the first duplicated user information block 42 specified by the first physical address PBA5. In the description here, in step S104 of FIG. 14, the computing device 50 decides "LBA4" as the mirror logical address corresponding to the logical address LBA1 with reference to FIG. 19.

The computing device 50 determines whether or not the first duplicated user information block 42 specified by the first physical address PBA5 found in the foregoing is a tentative late defective block as in the first embodiment. Suppose the access request including the logical address LBA1 is continued to be inputted in the memory card 3, resulting in the occurrence of a tentative late defect in the first duplicated user information block 42 specified by the first physical address PBA5 as well (see FIG. 21). In this case, the computing device 50 determines the relevant first duplicated user information block 42 to be a tentative late defective block, and performs the next processing.

The computing device 50 stores the address information of "PBA5" in a block (not shown) making up another second management area in the controller memory 52 (the reason for the storage in the other second management area is the same as the reason for the first physical address storage in the second management area 52I described in step S103). The computing device 50 decides "LBA7" as the other mirror logical address corresponding to the logical address LBA1, referring to FIG. 19.

Thereafter, as described in step S105 of FIG. 14, when the logical address LBA1 is inputted after the tentative late defect has occurred, the computing device 50 carries out the above-described first logical-physical conversion processing. Here, in the relevant first logical-physical conversion processing, the other mirror logical address needs to be read in place of the logical address. Accordingly, the relevant first logical-physical conversion processing is processing using the other mirror logical address LBA7 decided in the foregoing and information of the first management area 52I in the controller memory 52 (information stored in the second block 52ba).

The first physical address PBA10 corresponding to the other mirror logical address LBA7 (in other words, the inputted logical address LBA1) is calculated by the above-described first logical-physical conversion processing. The memory controller 5 then makes an access to the second duplicated user information block 42 specified by the first physical address PBA10 (see FIG. 21).

In the present embodiment as well, the computing device 50 performs the refresh processing described in the second embodiment. For example, the computing device 50 repairs the user information block 42 (PBA2) and the first duplicated user information block (PBA5) each determined to be the tentative late defective block, using the information in the second duplicated user information block 42 specified by the first physical address PBA10.

Hereinafter, the computing device 50 deals with the block 42 for which the repair has not succeeded as a result of the repair as a permanent late defective block as described the second embodiment, and performs the processing for addressing this (see step S205 of FIG. 17). That is, the first physical address information of the first block beyond repair is transferred from the second management area (the other second management area) to the second reserve management area (another second reserve management area) of the memory 4. Moreover, when the repair has succeeded, as described in the second embodiment as well, the computing device 50 deletes the first physical address information of the repaired tentative late defective block from the second management area and the other second management area of the controller memory 52.

As described above, in the present embodiment, the plurality of mirror areas are prepared. Accordingly, further increase in reliability of the memory system can be achieved.

In the foregoing, the case where the number of the (physical and logical) mirror areas is two has been discussed. However, the above description can also be applied to a case where the number of the (physical and logical) mirror areas is three or more. Operation in the case of the configuration of three or more mirror areas is briefly described while discussing a specific example below.

For example, the address area other than the logical mirror areas in the logical space (in the example of FIGS. 18A and 18B, the area that LBA0 to LBA2 belong to) is referred to as a "logical original area". Also, the address area other than the physical mirror areas in the physical space (in the example of FIGS. 18A and 18B, the area that PBA0 to PBA3 belong to) is referred to as a "physical original area". Moreover, the data capacity of the user information is equivalent to Nu of the first blocks 42.

Moreover, suppose as the logical mirror areas, Nm logical mirror areas of a first logical mirror area, a second logical mirror area, . . . and an Nm-th logical mirror area exist. Furthermore, suppose in the logical address space, the logical original area, the first logical mirror area, the second logical mirror area, . . . and the Nm-th logical mirror area are provided in this order so that the logical addresses thereof are consecutive. Moreover, suppose the n(=1 to Nu)-th logical address in the logical original area has a one-on-one relationship with the n-th logical address in the $\alpha$(=1 to Nm)-th mirror area. As in the foregoing, the one-on-one relationships are set in the computing device 50 in advance. Here, it can be understood that the logical addresses belonging to the second logical mirror area, the logical addresses belonging to the third logical mirror area, . . . and the logical addresses belonging to the Nm-th logical mirror area are other logical mirror addresses, respectively.

Suppose as the physical mirror areas, Nm physical mirror areas of a first physical mirror area, a second physical mirror area, . . . and an Nm-th physical mirror area exist. Here, in each of the physical mirror areas, a duplicate of the user information stored in the physical original area (the data amount is equivalent to the foregoing Nu blocks) is stored. Moreover, suppose in the plurality of first blocks, the physical original area, the first physical mirror area, the second physical mirror area, . . . the Nm-th physical mirror area are provided so that the first physical addresses thereof are consecutive (however, the addresses of the initial defect blocks are excluded). Data of the n(=1 to Nu)-th block in the user information stored in a $\beta$(=1 to Nm)-th physical mirror area is a duplicate of data of the n(=1 to Nu)-th block in the user information stored in the physical original area. Here, it can be understood that the blocks making up the second physical mirror area, the blocks making up the third physical mirror area, . . . the blocks making up the Nm-th physical mirror area are other duplicated user information blocks.

On the above-described premise, when the Nu-th logical address in the logical original area is inputted to the memory card 3, the computing device 50 carries out the first logical-physical conversion processing to calculate a first physical address A in the physical original area.

Thereafter, when the computing device 50 determines that a tentative late defect has occurred in the first block 42 of the first physical address A, the computing device 50 records "A" on a second-first management area in the controller memory 52. The computing device 50 decides the Nu-th logical address in the first logical mirror area, which has the one-on-one relationship with the Nu-th logical address in the logical original area. The computing device 50 carries out the above-described first logical-physical conversion processing using the decided logical address to calculate a first physical address B in the first physical mirror area. Here, in the first block 42 of the first physical address B, a duplicate of the data stored in the first block 42 of the first physical address A is stored. In the second-first management area, "A" is stored. Accordingly, after this, when the Nu-th logical address in the logical original area is inputted to the memory card 3, the computing device 50 refers to the second-first management area to confirm the recording of "A", and then decides the Nu-th logical address in the above-described first logical mirror area and calculates the above-described first physical address B.

Thereafter, when the computing device 50 determines that a tentative late defect has occurred in the first block 42 of the first physical address B, the computing device 50 records "B" on a second-second management area in the controller memory 52. The computing device 50 decides the Nu-th logical address in the second logical mirror area, which has the one-on-one relationship with the Nu-th logical address in the logical original area. The computing device 50 carries out the above-described first logical-physical conversion processing using the decided logical address to calculate a first physical address C in the second physical mirror area. Here, in the first block 42 of the first physical address C, a duplicate of the data stored in the first block 42 of the first physical address A is stored. In the second-first management area, "A" is stored, and in the second-second management area, "B" is stored. Accordingly, after this, when the Nu-th logical address in the logical original area is inputted to the memory card 3, the computing device 50 refers to the second-first and second-second management areas to confirm the recording of "A" and "B", and then decides the Nu-th logical address in the above-described second logical mirror area and calculates the above-described first physical address C.

Thereafter, when the computing device 50 determines that a tentative late defect has occurred in the first block 42 of the first physical address C, the computing device 50 records "C" on a second-third management area in the controller memory 52. The computing device 50 decides the Nu-th logical address in the third logical mirror area, which has the one-on-one relationship with the Nu-th logical address in the logical original area. The computing device 50 carries out the above-described first logical-physical conversion processing using the decided logical address to calculate a first physical address D in the third physical mirror area. Here, in the first block 42 of the first physical address D, a duplicate of the data stored in the first block 42 of the first physical address A is stored. In the second-first management area, "A" is stored, in the second-second management area, "B" is stored, and in the second-third management area, "C" is stored. Accordingly, after this, when the Nu-th logical address in the logical original area is inputted to the memory card 3, the computing device 50 refers to the second-first, second-second and second-third management areas to confirm the recording of the "A", "B" and "C", and then decides the Nu-th logical address in the above-described third logical mirror area and calculates the above-described first physical address D.

Thereafter, suppose a tentative late defect has repeatedly occurred in the first block 42 of the first physical address newly calculated, and the tentative late defect has occurred in the first block 42 of a first physical address NN in the Nm-1st physical mirror area. At this time, the computing device 50 determines the occurrence and records "NN" on a second-Fth management area in the controller memory 52. The computing device 50 decides the Nu-th logical address in the Nm-th logical mirror area, which has the one-on-one relationship with the Nu-th logical address in the logical original area. The computing device 50 carries out the above-described first logical-physical conversion processing using the decided logical address to calculate a first physical address Θ in the Nm-th physical mirror area. Here, in the first block 42 of the first physical address Θ, a duplicate of the data stored in the first block 42 of the first physical address A is stored. In the second-first management area, "A" is stored, in the second-second management area, "B" is stored, in the second-third management area, "C" is stored, . . . , and in the second-Fth management area, "NN" is stored. Accordingly, after this, when the Nu-th logical address in the logical original area is inputted to the memory card 3, the computing device 50 refers to the second-first, second-second, second-third, . . . , second-Fth management areas to confirm the recording of the "A", "B", "C", . . . , "NN", and then decides the Nu-th logical address in the above-described Nm logical mirror area and calculates the above-described first physical address NN.

Fourth Embodiment

In the second embodiment, the case where the first physical address information of the first block 42 determined to be the permanent late defective block is stored in the fourth block in the controller memory 52, and the second reserve management area 41B of the memory 4 has been discussed.

In the present embodiment, operation of the logical-physical conversion processing when a tentative late defective block and a permanent late defective block occurred is described. The permanent late defective block may occur, for example, at the time of the foregoing refresh processing (repair processing) or the like involving the data writing processing or the like.

In the present embodiment, the logical addresses LBA20 to LBA31 shown in FIG. 11A are used as alternate logical addresses. Here, in the memory controller 5 (computing device 50), "LBA20" is set as an initial address (leading alternate logical address) of the alternate logical addresses LBA20 to LBA31.

Moreover, in the first embodiment, in FIG. 11B, the first blocks 42 of the first physical addresses PBA26 to PBA31 are unused blocks. In the present embodiment, however, as shown in FIG. 22, the first blocks 42 of the first physical addresses PBA26 to PBA31 function as the alternate blocks.

Next, operation of the present embodiment is described.

In the present embodiment as well, before the logical-physical conversion processing in the computing device 50, the computing device 50 transfers the redundant information 44 of the memory 4 to the controller memory 52 as the reference information 55. Here, as shown in FIG. 23, the same information as that of the first management area 52I shown in FIG. 10 is stored in the first management area 52I. In contrast, as shown in FIG. 23, in the present embodiment, "PBA12" and "PBA18" are stored in the fourth blocks 52bb of the second management area 52FA as the first physical address information.

As described above, as the fourth physical address of the fourth block 52bb is ascending (FA_RAD0→FA_RAD1→FA_RAD2→FA_RAD3), the (first) physical addresses of the relevant permanent late defective blocks are stored in the respective fourth blocks 52bb in the order of occurrence of the permanent late defective blocks in the memory 4. Accordingly, in the example of FIG. 23, it can be understood that the first block 42 of the first physical address PBA12 first became a permanent late defective block, and then, the first block 42 of the first physical address PBA18 became a permanent late defective block.

Moreover, in the present embodiment, the third block 52*bc* of the third management area 52TA, the first physical address information "PBA6" of the tentative late defective block is stored.

Figure 24:
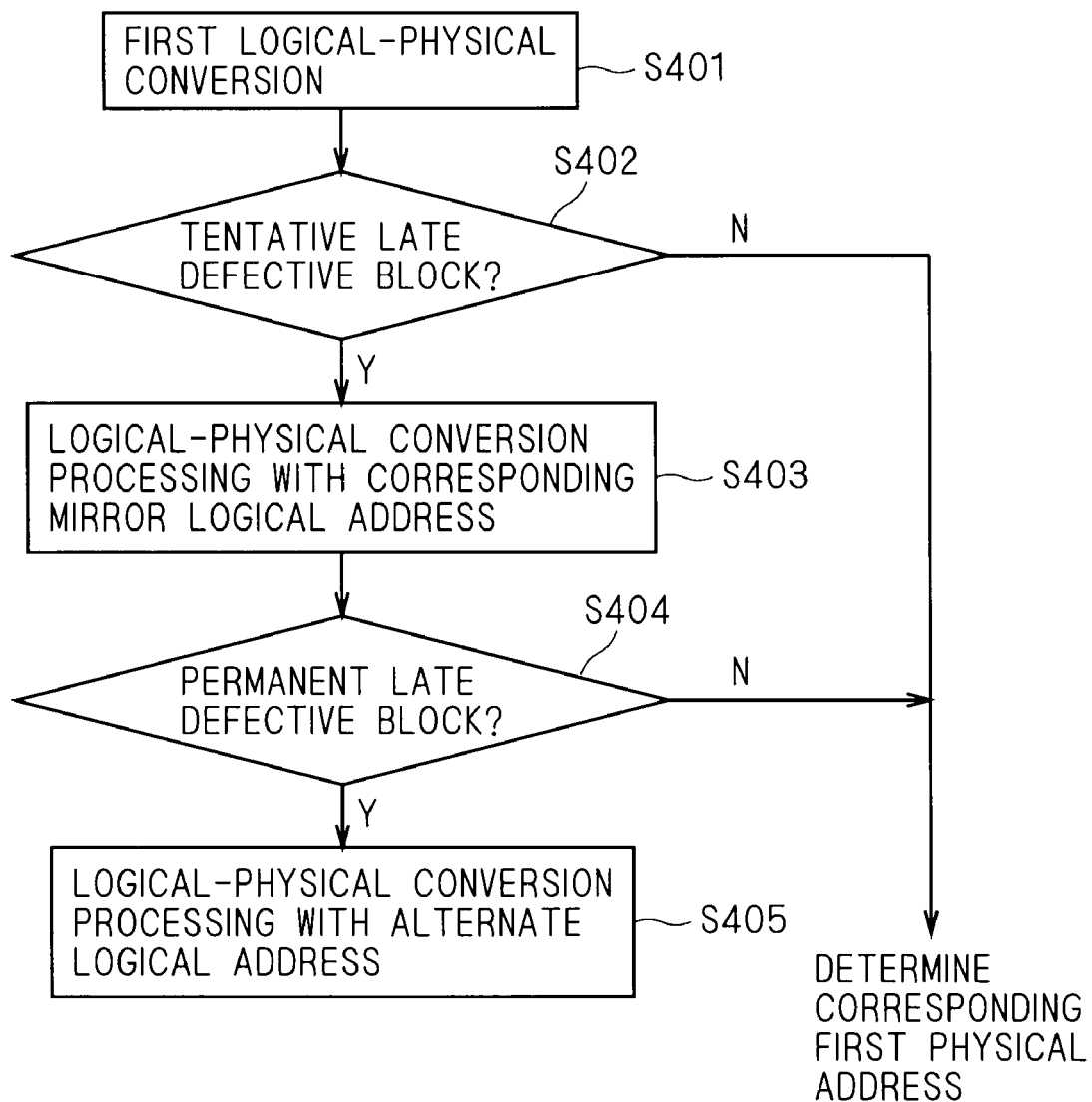
FIG. 24 is a flowchart for explaining the logical-physical conversion processing operation according to the fourth embodiment.

Under the above-described premise, in the present embodiment, the computing device 50 carries out a flow shown in FIG. 24.

Suppose the memory card 3 receives an access request including the logical address LBA4 (e.g., a writing request or the like). In this case, as described in step S101, the computing device 50 carries out the above-described first logical-physical conversion processing (step S401 of FIG. 24). Step S401 allows the computing device 50 to decide "PBA6" as the first physical address corresponding to the logical address LBA4.

Next, the computing device 50 determines whether or not "PBA6" is stored as the first physical address information in the third block with reference to the third management area 52TA (step S402). On the above-described premise, the first block 42 of the first physical address PBA6 is the tentative late defective block (see the third management area 52TA in FIGS. 22 and 23). Accordingly, the determination in step S402 is "Y", and the computing device 50 starts processing in step S403.

In contrast to the above-described premise, suppose the first block 42 of the first physical address PBA6 is not the tentative late defective block. In this case ("N" in step S402"), the computing device 50 decides "PBA6" as the first physical address corresponding to the logical address LBA4. The computing device 50 carries out access to the first block 42 of the first physical address PBA6 in accordance with the access request.

In step S403, as described in step S104, the computing device 50 decides the mirror logical address LBA14 corresponding to the logical address LBA4 with reference to the table shown in FIG. 12. Furthermore, in step S403, as described in step S105, the computing device 50 calculates the first physical address corresponding to the mirror logical address LBA14 (in other words, the inputted logical address LBA4) by the above-described first logical-physical conversion processing (however, the mirror logical address needs to be read in place of the logical address) using the decided mirror logical address LBA14 and the information of the first management area 52I in the controller memory 52 (information stored in the second blocks 52*ba*).

By applying the above-described first logical-physical conversion processing, "PBA18" is found as the first physical address (see FIG. 22). Here, when the duplicated user information block 42 of the first physical address PBA18 is a normal block, duplicated data of the user information stored in the user information block 42 of the first physical address PBA6 is stored in the relevant duplicated user information block 42.

Next, the computing device 50 refers to the second management area 52FA. The computing device 50 determines whether or not the first physical address "PBA18" found in step S403 matches the information stored in the fourth blocks 52*bb* (step S404).

Here, when the occurrence number of the permanent late defective blocks is small, the determination processing in step S404 may be carried out to all the fourth blocks 52*bb*. In contrast, when the number of the permanent late defective blocks is large, another table in which the second management area 52FA is rearranged in the ascending order of the address, for example, at the start time of power supply or the like, is provided to carry out binary search in the above-mentioned another table.

On the above-described premise, "PBA18" is stored in the fourth block 52*bb* of the secondly-described physical address FA_RAD1 in the second management area 52FA as shown in FIG. 23. Accordingly, the computing device 50 determines that the duplicated user information block 42 of the first physical address PBA18 is a permanent late defective block (see FIG. 22). The determination in step S404 is "Y", and the processing shifts to step S405.

In contrast to the above-described premise, the duplicated user information block 42 of the first physical address PBA18 is not the permanent late defective block (that is, the information of "PBA18" is not stored in the fourth block 52*bb*). In this case, ("N" in step S404), the computing device 50 decides "PBA18" as the first physical address corresponding to the logical address LBA4. Access in accordance with the access request is carried out to the first block 42 of the first physical address PBA18.

When the match is determined in step S404 ("Y" in step S404), the computing device 50 calculates a alternate logical address by "alternate logical address=leading alternate logical address+alternate logical offset . . . (Expression A)" (step S405).

Here, in the computer 2 and the memory card 3, "LBA20" is set in advance as the leading alternate logical address. Moreover, the alternate logical offset is settled unambiguously from the physical address (fourth physical address) in the second management area 52FA of the fourth block 52*bb* in which the first physical address found in step S403 is stored (settled unambiguously from the ending numeral of the relevant fourth address).

For example, suppose the first physical address found in step S403 is stored in the leading fourth block 52*bb*. In this case, since the fourth physical address of the leading fourth block 52*bb* is "FA_RAD0", the alternate logical offset is decided to be "0". Moreover, suppose the first physical address found in step S403 is stored in the second fourth block 52*bb*. In this case, since the fourth physical address of the second fourth block 52*bb* is "FA_RAD1", the alternate logical offset is decided to be "1". Similarly, suppose the first physical address found in step S403 is stored in the third fourth block 52*bb*. In this case, since the fourth physical address of the third fourth block 52*bb* is "FA_RAD2", the alternate logical offset is decided to be "2".

In the above-described example, the first block 42 of the first physical address PBA18 is the second permanent late defective block. Accordingly, as shown in FIG. 23, "PBA18" found in step S403 is stored in the fourth physical address FA_RAD1 in the second management area 52FA. Thus, the alternate logical offset is decided to be "1".

Accordingly, LBA20+1 is found from expression A, and the computing device 50 obtains LBA21 as the alternate logical address ("21" is a sum of the numeral "20" of the leading alternate logical address and the value "1" of the alternate logical offset).

Next, the computing device 50 calculates the alternate physical address corresponding to the alternate logical address LBA21 by the above-described first logical-physical conversion processing (however, the alternate logical address needs to be read in place of the logical address) using the alternate logical address LBA21 found in the foregoing and the information of the first management area 52I in the controller memory 52 (information stored in the second blocks 52*ba*) (step S405). By applying the above-described logical-physical conversion processing, "PBA28" is found as the alternate physical address.

The computing device 50 decides the alternate physical address PBA28 calculated in the foregoing as the first physical address corresponding to the inputted logical address LBA4 (step S405; see FIG. 22).

As described above, in the present embodiment, the fourth blocks 52*bb* that store the address information of the permanent late defective blocks are provided, and the computing device 50 determines whether or not the first physical address found in step S403 matches the information stored in the fourth block 52*bb* (step S404).

Accordingly, when the first physical address found in step S403 is accessed, whether or not a permanent late defect has occurred in the accessed first block 42 can be determined, and whether or not to perform further logical-physical conversion processing can be determined.

In the present embodiment, when the computing device 50 determines that a permanent late defect has occurred in the accessed first block 42, it finds the alternate logical address based on the fourth physical address of the fourth block 52*bb* storing the first physical address found in step S401, and the leading alternate logical address prepared in advance (step S405). The computing device 50 finds the first physical address corresponding to the given logical address, based on the relevant alternate logical address and the information stored in the second blocks 52*ba* (step S405).

Accordingly, even when the duplicated user information block 42 becomes a permanent late defective block, the block 42 of a alternate destination corresponding to the inputted given logical address can be decided by the simple method.

Moreover, the first physical addresses of the permanent late defective blocks are stored in the fourth blocks 52*bb* in the order of the fourth physical addresses FA_RAD0 to FA_RAD3 in accordance with the order of occurrence of the permanent late defects.

Accordingly, the number of the fourth blocks 52*bb* necessary for finding the first physical address can be reduced.

While the invention has been shown and described in detail, the foregoing description is in all aspects illustrative and not restrictive. It is therefore understood that numerous modifications and variations can be devised without departing from the scope of the invention.

What is claimed is:

1. A memory system comprising:
a plurality of first blocks that store information including user information, wherein first physical addresses that do not overlap one another are respectively assigned to the plurality of first blocks;
a plurality of second blocks that respectively store first physical addresses of initial defect blocks out of said plurality of first blocks;
a plurality of user information blocks, out of said plurality of first blocks, that store said user information;
a plurality of duplicated user information blocks, out of said plurality of first blocks, that each store a duplicate of said user information; and
a computing device that finds a first physical address corresponding to a given logical address that provides access to a user information block, wherein
said computing device has, as information, mirror logical addresses for accessing said plurality of duplicated user information blocks, any one of the mirror logical addresses having a one-on-one correspondence relationship with the given logical address,
said computing device finds said first physical address corresponding to said given logical address based on said given logical address and the information stored in said second blocks, determines whether or not a first block specified by the found first physical address is a tentative late defective block and, when it is determined that said first block is said tentative late defective block, finds said first physical address corresponding to said given logical address again, based on said given mirror logical address corresponding to said given logical address and the information stored in said second blocks,
second physical addresses that do not overlap one another are respectively assigned to said plurality of second blocks,
said first physical addresses of said initial defect blocks stored in said plurality of second blocks are stored in said plurality of second blocks in the order of said second physical addresses in accordance with the order of said first physical addresses,
said computing device, when finding said first physical address corresponding to said given logical address again, based on the given mirror logical address corresponding to said given logical address and the information stored in said second blocks,
(A) searches a target block from said plurality of second blocks using said given mirror logical address;
(B) finds a number of the plurality of first blocks, existing before a first physical address of an initial defect block read from said target block, other than said initial defect blocks, based on said first physical address of said initial defect block read from said target block, and said second physical address of said target block; and
(C) finds said first physical address corresponding to said given logical address, based on said given mirror logical address and said number.

2. A memory system comprising:
a plurality of first blocks that store information including user information, wherein first physical addresses that do not overlap one another are respectively assigned to the plurality of first blocks;
a plurality of second blocks that respectively store first physical addresses of initial defect blocks out of said plurality of first blocks;
a plurality of user information blocks, out of said plurality of first blocks, that store said user information;
a plurality of duplicated user information blocks, out of said plurality of first blocks, that each store a duplicate of said user information;
a computing device that finds a first physical address corresponding to a given logical address that provides access to a user information block; and
a plurality of third blocks, wherein
said computing device has, as information, mirror logical addresses for accessing said plurality of duplicated user information blocks, any one of the mirror logical addresses having a one-on-one correspondence relationship with the given logical address,
said computing device finds said first physical address corresponding to said given logical address based on said given logical address and the information stored in said second blocks, determines whether or not a first block specified by the found first physical address is a tentative late defective block and, when it is determined that said first block is said tentative late defective block, finds said first physical address corresponding to said given logical address again, based on said given mirror logical address corresponding to said given logical address and the information stored in said second blocks,
the plurality of third blocks are provided to respectively store said first physical addresses of tentative late defective blocks out of said plurality of first blocks, and said computing device records, when said first block is determined to be said tentative late defective block, said first physical address of said first block in a third block.

3. The memory system according to claim 2, wherein said computing device repairs said first block determined to be said tentative late defective block, using information in said duplicated user information block corresponding to the first block.

4. The memory system according to claim 3, wherein said computer device transfers, when determining that said first block is beyond repair as a result of said repair, first physical address information of said first block determined to be beyond repair from said third block to a management area made up of a part of said plurality of first blocks as information relating to a permanent late defective block.

5. The memory system according to claim 2, wherein said plurality of said second blocks and said plurality of third blocks are held in a volatile memory.

6. A memory system comprising:
a plurality of first blocks that store information including user information, wherein first physical addresses that do not overlap one another are respectively assigned to the plurality of first blocks;
a plurality of second blocks that respectively store first physical addresses of initial defect blocks out of said plurality of first blocks;
a plurality of user information blocks, out of said plurality of first blocks, that store said user information;
a plurality of duplicated user information blocks, out of said plurality of first blocks, that each store a duplicate of said user information;
a computing device that finds a first physical address corresponding to a given logical address that provides access to a user information block; and
a plurality of fourth blocks, wherein
said computing device has, as information, mirror logical addresses for accessing said plurality of duplicated user information blocks, any one of the mirror logical addresses having a one-on-one correspondence relationship with the given logical address,
said computing device finds said first physical address corresponding to said given logical address based on said given logical address and the information stored in said second blocks, determines whether or not a first block specified by the found first physical address is a tentative late defective block and, when it is determined that said first block is said tentative late defective block, finds said first physical address corresponding to said given logical address again, based on said given mirror logical address corresponding to said given logical address and the information stored in said second blocks,
the plurality of fourth blocks are provided to respectively store first physical addresses of permanent late defective blocks out of said plurality of first blocks,
said computing device determines whether or not said first physical address found again based on said given mirror logical address corresponding to said given logical address and the information stored in said second blocks matches information stored in said fourth blocks,
fourth physical addresses not overlapping one another are respectively assigned to said fourth blocks, and
when determining that said first physical address found again based on said given mirror logical address corresponding to said given logical address and the information stored in said second blocks matches the information stored in said fourth blocks, said computing device finds an alternate logical address based on a fourth physical address of a fourth block storing said first physical address and a leading alternate logical address prepared in advance, and finds said first physical address corresponding to said given logical address based on said alternate logical address and the information stored in said second blocks.

7. The memory system according to claim 6, wherein said first physical addresses of said permanent late defective blocks stored in said fourth blocks are stored in said fourth blocks in the order of said fourth physical addresses in accordance with the order of occurrence of permanent late defects.

* * * * *